US011235823B2

(12) United States Patent
Abdelkader et al.

(10) Patent No.: US 11,235,823 B2
(45) Date of Patent: Feb. 1, 2022

(54) AUTOMATION METHODS FOR UAV PERCHING ON PIPES

(71) Applicants: Saudi Arabian Oil Company, Dhahran (SA); KING ABDULLAH UNIVERSITY OF SCIENCE AND TECHNOLOGY, Thuwal (SA)

(72) Inventors: Mohamed Abdelkader, Thuwal (SA); Fadl Abdellatif, Thuwal (SA); Jeff S. Shamma, Thuwal (SA)

(73) Assignees: Saudi Arabian Oil Company, Dhahran (SA); King Abdullah University Of Science And Technology, Thuwal (SA)

( * ) Notice: Subject to any disclaimer, the term of this patent is extended or adjusted under 35 U.S.C. 154(b) by 248 days.

(21) Appl. No.: 16/696,085

(22) Filed: Nov. 26, 2019

(65) Prior Publication Data

US 2020/0174129 A1    Jun. 4, 2020

Related U.S. Application Data

(60) Provisional application No. 62/772,700, filed on Nov. 29, 2018.

(51) Int. Cl.
*B62D 57/024* (2006.01)
*G06T 7/50* (2017.01)
(Continued)

(52) U.S. Cl.
CPC ............ *B62D 57/024* (2013.01); *B60G 3/01* (2013.01); *B60G 11/00* (2013.01); *B60K 1/02* (2013.01);
(Continued)

(58) Field of Classification Search
USPC .......................................................... 701/3
See application file for complete search history.

(56) References Cited

U.S. PATENT DOCUMENTS 8,798,372 B1    8/2014  Korchev et al.
11,097,796 B2 *  8/2021  Abdellatif .......... G06K 9/00664
(Continued)

FOREIGN PATENT DOCUMENTS

CN    106647790 A    5/2017
CN    106931963 A    7/2017
(Continued)

OTHER PUBLICATIONS

Written Opinion of the International Preliminary Examining Authority in Corresponding International Application No. PCT/US2019/063586 dated Jun. 23, 2020. 6 pages.
(Continued)

*Primary Examiner* — Tyler D Paige
(74) *Attorney, Agent, or Firm* — Leason Ellis LLP

(57) ABSTRACT

An unmanned aerial vehicle (UAV) autonomously perching on a curved surface from a starting position is provided. The UAV includes: a 3D depth camera configured to capture and output 3D point clouds of scenes from the UAV including the curved surface; a 2D LIDAR system configured to capture and output 2D slices of the scenes; and a control circuit. The control circuit is configured to: control the depth camera and the LIDAR system to capture the 3D point clouds and the 2D slices, respectively, of the scenes; input the captured 3D point clouds from the depth camera and the captured 2D slices from the LIDAR system; autonomously detect and localize the curved surface using the captured 3D point clouds and 2D slices; and autonomously direct the UAV from the starting position to a landing position on the curved surface based on the autonomous detection and localization of the curved surface.

20 Claims, 11 Drawing Sheets

(51) Int. Cl.
*G01S 17/86* (2020.01)
*B64C 39/02* (2006.01)
*G05D 1/00* (2006.01)
*G06K 9/00* (2006.01)
*H04N 5/222* (2006.01)
*G01B 17/02* (2006.01)
*B60R 11/00* (2006.01)
*B60G 3/01* (2006.01)
*G01N 29/265* (2006.01)
*G08G 5/00* (2006.01)
*F17D 5/00* (2006.01)
*B60B 19/00* (2006.01)
*G01B 7/28* (2006.01)
*B60K 1/02* (2006.01)
*B62D 21/09* (2006.01)
*B60G 11/00* (2006.01)
*B62D 61/12* (2006.01)
*G01N 29/04* (2006.01)
*B62D 9/00* (2006.01)
*B64C 25/24* (2006.01)
*B64C 25/36* (2006.01)
*B64C 25/40* (2006.01)
*B64D 1/02* (2006.01)
*G05D 1/10* (2006.01)
*B64C 25/32* (2006.01)
*G01S 17/89* (2020.01)

(52) U.S. Cl.
CPC .............. *B60R 11/00* (2013.01); *B62D 9/002* (2013.01); *B62D 21/09* (2013.01); *B62D 61/12* (2013.01); *B64C 25/24* (2013.01); *B64C 25/32* (2013.01); *B64C 25/36* (2013.01); *B64C 25/405* (2013.01); *B64C 39/02* (2013.01); *B64C 39/024* (2013.01); *B64D 1/02* (2013.01); *G01B 17/02* (2013.01); *G01N 29/04* (2013.01); *G01N 29/265* (2013.01); *G01S 17/86* (2020.01); *G01S 17/89* (2013.01); *G05D 1/0088* (2013.01); *G05D 1/0094* (2013.01); *G05D 1/101* (2013.01); *G06K 9/00664* (2013.01); *G06T 7/50* (2017.01); *H04N 5/2226* (2013.01); *B60R 2011/004* (2013.01); *B60R 2011/008* (2013.01); *B60R 2011/0084* (2013.01); *B64C 2201/027* (2013.01); *B64C 2201/12* (2013.01); *B64C 2201/123* (2013.01); *B64C 2201/127* (2013.01); *B64C 2201/141* (2013.01); *B64C 2201/18* (2013.01); *G01N 2291/0289* (2013.01); *G01N 2291/02854* (2013.01); *G06T 2207/10028* (2013.01)

(56) References Cited

U.S. PATENT DOCUMENTS

| 2014/0163781 | A1 | 6/2014 | Vian et al. |
| 2018/0017679 | A1* | 1/2018 | Valouch .............. H01L 31/0224 |
| 2018/0046187 | A1 | 2/2018 | Martirosyan et al. |
| 2018/0292541 | A1* | 10/2018 | De Silva .............. G01S 19/072 |
| 2019/0348862 | A1* | 11/2019 | Obayashi ................ H01F 27/02 |
| 2020/0011995 | A1* | 1/2020 | Send ..................... G01S 7/4814 |

FOREIGN PATENT DOCUMENTS

| CN | 109934871 A | 6/2019 |
| CN | 109976379 A | 7/2019 |
| EP | 2884305 A1 | 6/2015 |
| EP | 3268828 A1 | 1/2018 |
| EP | 3315406 A1 | 5/2018 |
| WO | 2017050893 A1 | 3/2017 |

OTHER PUBLICATIONS

International Search Report and Written Opinion in Corresponding PCT Application No. PCT/US19/63586 dated Mar. 9, 2020. 11 pages.

* cited by examiner

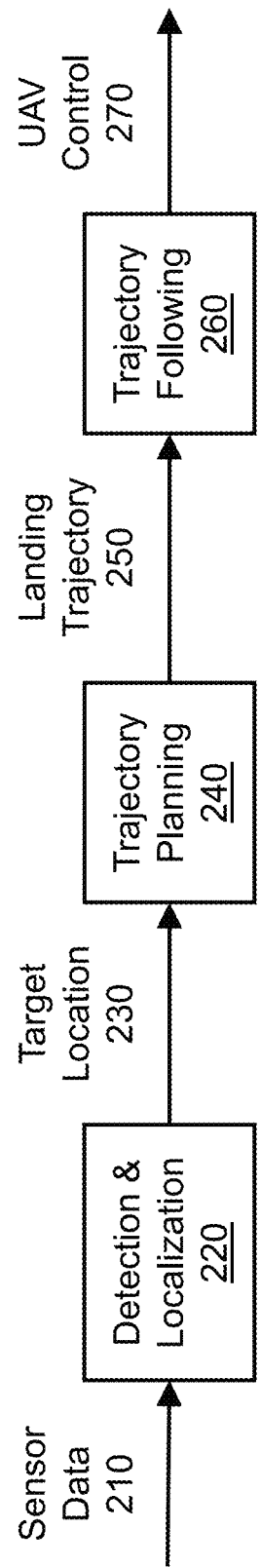

```
┌─────────────────────────────────────────────────────────┐
│ Cluster points closer than 5cm gap and ignore any       │
│ cluster with fewer than n points                        │
│ 610                                                     │
└─────────────────────────────────────────────────────────┘
                          ↓
┌─────────────────────────────────────────────────────────┐
│ Fit a circle through 3 random points in a random        │
│ eligible cluster                                        │
│ 620                                                     │
└─────────────────────────────────────────────────────────┘
                          ↓
┌─────────────────────────────────────────────────────────┐
│ Calculate the algebraic error of all other points in    │
│ cluster using circle's equation                         │
│ 630                                                     │
└─────────────────────────────────────────────────────────┘
                          ↓
┌─────────────────────────────────────────────────────────┐
│ Count number of inlier points in the cluster that are   │
│ close to the circle                                     │
│ 640                                                     │
└─────────────────────────────────────────────────────────┘
                          ↓
                    ◇ Inliers > n ◇ ──── No ────┐
                      650                       │
                          ↓ Yes                 │
┌─────────────────────────────────────────────┐ │
│ Best fit a new circle through all inliers   │ │
│ and calculate the total residual error      │ │
│ 660                                         │ │
└─────────────────────────────────────────────┘ │
                          ↓                     │
                    ◇ New circle better than ◇──┤ No
                    670  previous best circle   │
                          ↓ Yes                 │
┌─────────────────────────────────────────────┐ │
│ 680   Save the circle as the best circle    │─┘
└─────────────────────────────────────────────┘
```

710 — 1. Perform cylinder detection with RANSAC

720 — 2. Operator selects a valid candidate cylinder and current valid centroid is updated with its centroid 730 — 3. The next input cloud is cropped around the previous valid centroid computed 740 — 4. A RANSAC-based segmentation is applied to the cropped cloud in step 3 and the centroid of the resulting cylinder cloud is computed 750 — If the new centroid is in the neighborhood of the previous one — No →

Yes ↓

760 — 5. Update the current valid centroid

Start
↓
Capture and output 3D point clouds of scenes from the UAV that include curved surface using 3D depth camera
1010
↓
Capture and output 2D slices of scenes using 2D LIDAR system
1020
↓
Control depth camera and LIDAR system to capture 3D point clouds and 2D slices, respectively, of scenes
1030
↓
Input captured 3D point clouds from depth camera and captured 2D slices from LIDAR system
1040
↓
Autonomously detect and localize curved surface using captured 3D point clouds and captured 2D slices
1050
↓
Autonomously direct UAV from starting position to landing position on curved surface based on the autonomous detection and localization of curved surface
1060
↓
End

AUTOMATION METHODS FOR UAV PERCHING ON PIPES

CROSS-REFERENCE TO RELATED APPLICATION

The present application claims the benefit of U.S. Provisional Application No. 62/772,700, titled PERCHING UAV WITH RELEASABLE CRAWLER, filed on Nov. 29, 2018 with the U.S. Patent and Trademark Office, which is hereby incorporated by reference in its entirety.

FIELD OF THE DISCLOSURE

The present disclosure relates generally to the inspection and maintenance of a structure, and specifically to an inspection method using a perching unmanned aerial vehicle (UAV or drone) having a releasable and re-dockable crawler for inspecting and maintaining the structure. In addition, the present disclosure relates generally to the inspection and maintenance of curved ferromagnetic structures, such as pipes, and specifically to automation methods for UAV perching on these structures.

BACKGROUND OF THE DISCLOSURE

The inspection and maintenance of exposed metallic assets, such as pipes, storage tanks, and the like, can be difficult or impractical to perform by humans in some environments. In such circumstances, the use of automated UAV's may provide a workable alternative. However, such inspection and maintenance is often best performed using direct contact on the asset, versus hovering at a distance from the asset. A UAV, however, can be difficult to land, perch, or maneuver on the asset. Further, pipes (and other curved surface structures) can be especially challenging to inspect or maintain with a UAV, as these assets present curved surfaces with which to land, perch, or maneuver.

In addition, inspecting hard-to-reach steel assets in oil and gas facilities is a challenging task. For example, periodic inspection of elevated assets found in refineries, gas plants, offshore platforms, and other plants is of paramount importance to prevent unexpected failures, leaks, and shutdowns. These assets include high-elevation pipes and structures that are difficult to access during inspection jobs. One way to inspect such assets is to erect scaffolding for the inspector to access the asset and perform manual inspection, such as with an Ultrasonic Testing (UT) sensor for thickness measurements. Such scaffolding is not only expensive and introduces a significant cost barrier for frequent inspection, but also poses safety concerns mainly in the form of falling and tripping hazards.

It is in regard to these and other problems in the art that the present disclosure is directed to provide a technical solution for an effective perching UAV having a releasable crawler for inspecting or maintaining a structure. It is also in regard to these and other problems in the art that the present disclosure is directed to provide a technical solution for automation methods for UAV perching on pipes and other assets.

SUMMARY OF THE DISCLOSURE

According to an embodiment, an unmanned aerial vehicle (UAV) for autonomously perching on a curved surface from a starting position away from the curved surface is provided. The UAV comprises: a three-dimensional (3D) depth camera configured to capture and output 3D point clouds of scenes from the UAV comprising the curved surface; a two-dimensional (2D) light detection and ranging (LIDAR) system configured to capture and output 2D slices of the scenes; and a control circuit. The control circuit is configured to: control the depth camera and the LIDAR system to capture the 3D point clouds and the 2D slices, respectively, of the scenes; input the captured 3D point clouds from the depth camera and the captured 2D slices from the LIDAR system; autonomously detect and localize the curved surface using the captured 3D point clouds and the captured 2D slices; and autonomously direct the UAV from the starting position to a landing position on the curved surface based on the autonomous detection and localization of the curved surface.

In an embodiment, the control circuit is further configured to: use the captured 3D point clouds to perform the autonomous detection and localization from the starting position while autonomously directing the UAV to the landing position until the UAV reaches a proximity of the curved surface; and switch from using the 3D point clouds to using the captured 2D slices to perform the autonomous detection and localization once the UAV reaches the proximity of the curved surface.

In an embodiment, the control circuit is further configured to: autonomously direct the UAV to an alignment position within the proximity of the curved surface prior to the landing, the alignment position being where the UAV is aligned with respect to the landing position; and use the captured 2D slices to autonomously direct the UAV to move directly from the alignment position to the landing position.

In an embodiment, the control circuit is further configured to autonomously detect and localize the curved surface by fusing the 3D point clouds and the 2D slices. The fusing comprises: using one of the captured 3D point clouds to perform a first pass of the autonomous detection and localization of the curved surface; capturing a corresponding one of the 2D slices using the detected and localized curved surface from the first pass; and using the corresponding one of the 2D slices to perform a second pass of the autonomous detection and localization of the curved surface.

In an embodiment, the UAV further comprises an inertial measurement unit (IMU) configured to estimate the pose of the depth camera, wherein the control circuit is further configured to use the estimated pose of the depth camera between capturing a first one of the 3D point clouds and capturing a second one of the 3D point clouds in order to predict the location of the curved surface in the second one of the 3D point clouds from the detected and localized curved surface in the first one of the 3D point clouds.

In an embodiment, the control circuit is further configured to: use the captured 3D point clouds to autonomously detect and localize the curved surface; and control the LIDAR system to capture the 2D slices normal to the detected and localized curved surface.

In an embodiment, the curved surface is cylindrical and the control circuit is further configured to control the LIDAR system to capture the 2D slices normal to the central axis of the cylinder.

In an embodiment, the control circuit is further configured to use a random sample consensus (RANSAC) approach to autonomously detect and localize the curved surface.

In an embodiment, the control circuit is further configured to: use the captured 3D point clouds or the captured 2D slices or both the captured 3D point clouds and the captured 2D slices to detect one or more obstacles on a flight path of the UAV from the starting position to the landing position; and autonomously redirect the UAV to avoid the one or more obstacles on the flight path.

In an embodiment, the curved surface is ferromagnetic and the UAV further comprises magnetic legs configured to magnetically attach to the ferromagnetic curved surface during the landing and remain magnetically attached to the ferromagnetic curved surface after the landing.

According to another embodiment, a method of autonomously perching an unmanned aerial vehicle (UAV) on a curved surface from a starting position away from the curved surface is provided. The method comprises: capturing and outputting, using a three-dimensional (3D) depth camera attached to the UAV, 3D point clouds of scenes from the UAV comprising the curved surface; capturing and outputting, using a two-dimensional (2D) light detection and ranging (LIDAR) system attached to the UAV, 2D slices of the scenes; controlling the depth camera and the LIDAR system to capture the 3D point clouds and the 2D slices, respectively, of the scenes; inputting the captured 3D point clouds from the depth camera and the captured 2D slices from the LIDAR system; autonomously detecting and localizing the curved surface using the captured 3D point clouds and the captured 2D slices; and autonomously directing the UAV from the starting position to a landing position on the curved surface based on the autonomous detection and localization of the curved surface.

In an embodiment, the method further comprises: using the captured 3D point clouds to perform the autonomous detection and localization from the starting position while autonomously directing the UAV to the landing position until the UAV reaches a proximity of the curved surface; and switching from using the 3D point clouds to using the captured 2D slices to perform the autonomous detection and localization once the UAV reaches the proximity of the curved surface.

In an embodiment, the method further comprises: autonomously directing the UAV to an alignment position within the proximity of the curved surface prior to the landing, the alignment position being where the UAV is aligned with respect to the landing position; and using the captured 2D slices to autonomously direct the UAV to move directly from the alignment position to the landing position.

In an embodiment, the method further comprises autonomously detecting and localizing the curved surface by fusing the 3D point clouds and the 2D slices. The fusing comprises: using one of the captured 3D point clouds to perform a first pass of the autonomous detection and localization of the curved surface; capturing a corresponding one of the 2D slices using the detected and localized curved surface from the first pass; and using the corresponding one of the 2D slices to perform a second pass of the autonomous detection and localization of the curved surface.

In an embodiment, the UAV further comprises an inertial measurement unit (IMU) attached to the UAV, and the method further comprises: estimating the pose of the depth camera using the IMU; and using the estimated pose of the depth camera between capturing a first one of the 3D point clouds and capturing a second one of the 3D point clouds in order to predict the location of the curved surface in the second one of the 3D point clouds from the detected and localized curved surface in the first one of the 3D point clouds.

In an embodiment, the method further comprises: using the captured 3D point clouds to autonomously detect and localize the curved surface; and controlling the LIDAR system to capture the 2D slices normal to the detected and localized curved surface.

In an embodiment, the curved surface is cylindrical and the method further comprises controlling the LIDAR system to capture the 2D slices normal to the central axis of the cylinder.

In an embodiment, the method further comprises using a random sample consensus (RANSAC) approach to autonomously detect and localize the curved surface.

In an embodiment, the method further comprises: using the captured 3D point clouds or the captured 2D slices or both the captured 3D point clouds and the captured 2D slices to detect one or more obstacles on a flight path of the UAV from the starting position to the landing position; and autonomously redirecting the UAV to avoid the one or more obstacles on the flight path.

In an embodiment, the curved surface is ferromagnetic, the UAV further comprises magnetic legs, and the method further comprises magnetically attaching the magnetic legs to the ferromagnetic curved surface during the landing and remaining magnetically attached to the ferromagnetic curved surface after the landing.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

FIG. 2 is a block diagram of an autonomous guidance and landing technique for landing a UAV on a curved surface (such as a pipe), according to an embodiment.

FIG. 6 is a flow chart of an example circle (e.g., pipe) detection technique using clustering of 2D LIDAR sensor data, according to an embodiment.

FIG. 7 is a flow chart of an example neighborhood-based pipe detection technique, according to an embodiment.

FIG. 10 is a flow chart of an example method of autonomously perching a UAV on a curved surface from a starting position away from the curved surface, according to an embodiment.

DETAILED DESCRIPTION OF CERTAIN EMBODIMENTS OF THE DISCLOSURE

Figure 1A:
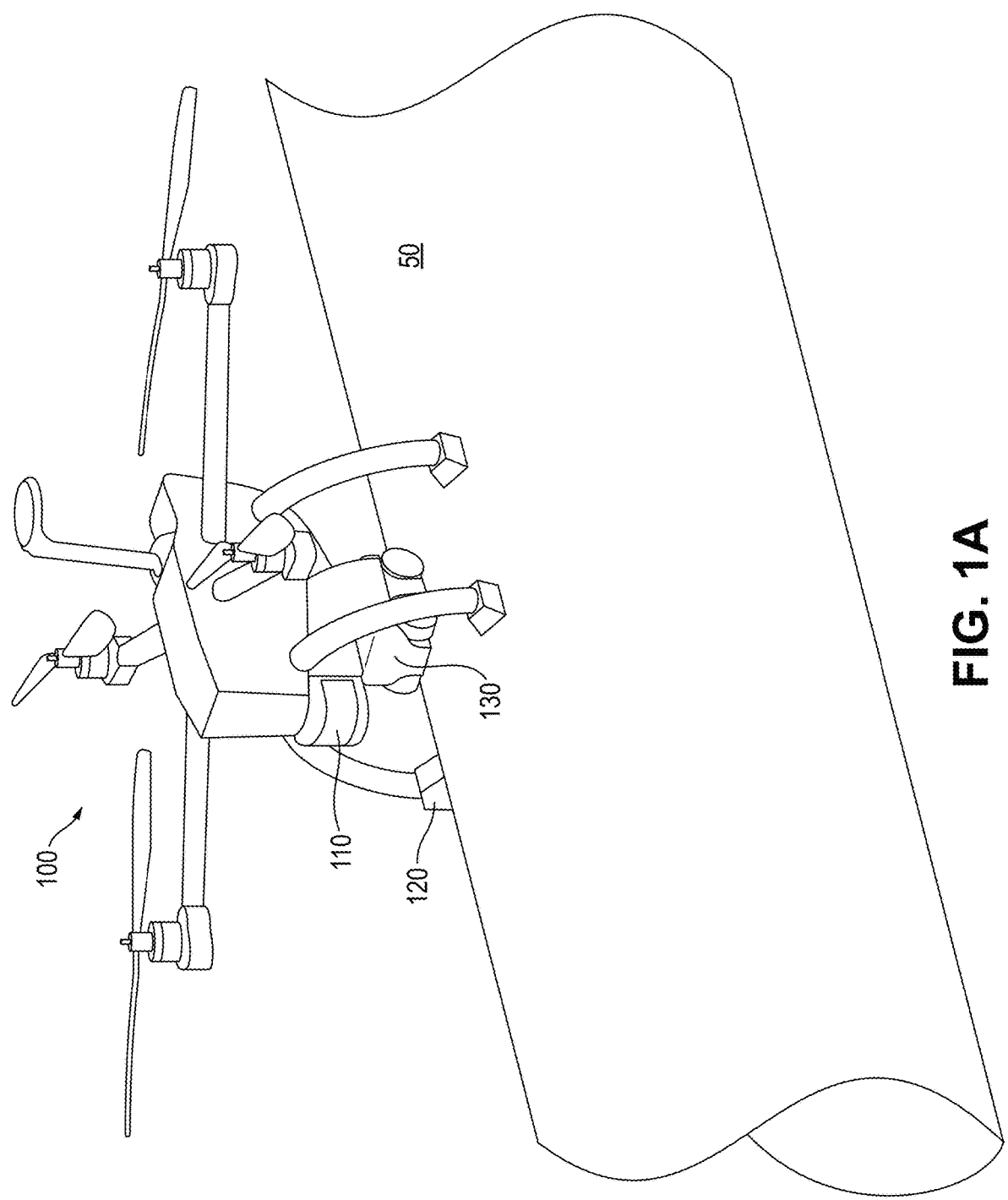
FIGS. 1A and 1B are illustrations of an example UAV perching on a structure (for example, a pipe), with the UAV having a releasable crawler for inspecting or maintaining the structure, according to an embodiment. The crawler is shown attached to the UAV in FIG. 1A and not attached to the UAV (e.g., crawling on the structure) in FIG. 1B.

In various example embodiments, a perching UAV having a releasable crawler for inspecting or maintaining a structure, such as a difficult-to-access pipe or storage tank, is provided. The UAV is a hybrid UAV that has advanced capabilities to perform contact inspection jobs on ferromagnetic surfaces such as carbon steel pipes and structures. The UAV can fly towards a pipe to be inspected, land on it autonomously (commonly referred to as perching), and deploy a releasable crawler to crawl around the pipe to perform, for example, elaborate inspection jobs.

As discussed earlier, the inspection and maintenance of exposed metallic assets, such as pipes, storage tanks, and the like, can sometimes be difficult or impractical to perform by people. For instance, one of the top challenges in the oil and gas industry is the periodic inspection of elevated assets found in refineries, gas plants, offshore platforms, and other plants and facilities. These assets include high elevation pipes and structures that are difficult to access during inspection or maintenance jobs. Sometimes the only way for people to inspect or maintain them is to erect scaffolding in order for the inspector or engineer to access the asset and perform, for example, manual inspection using an ultrasonic testing (UT) sensor for thickness measurements. Such scaffolding is not only expensive and introduces a significant cost barrier for frequent inspection, but also poses safety concerns mainly in the form of falling and tripping hazards.

Accordingly, in example embodiments, a perching UAV having a releasable crawler provides a solution to the aforementioned technical problems by having two vehicles in a mother/child configuration. Each vehicle is designed or optimized to perform the capabilities for which it is best suited. The vehicles include a perching UAV capable of flying and landing on a pipe, and a smaller magnetic crawler that is carried by and released from the UAV after landing or perching. The crawler can rove on the pipe (e.g., using magnetic wheels) and perform, for example, inspection scans such as thickness measurements using a UT sensor, or other inspections or maintenance. This provides for a more feasible approach than having the whole UAV crawl around the pipe, which requires larger and heavier motors and risks collisions with nearby pipes and assets, especially with limited clearance constraints.

In further various example embodiments, automation methods for UAV perching on pipes are provided. These automation methods further provide for systematic ways for autonomous and safer UAV perching. These automation methods further provide for perching (landing) a UAV on hard-to-reach steel structures including pipes in order to perform, for example, inspection jobs. In some such embodiments, a UAV is sent to perch on, for example, an elevated target (such as a pipe), and release a crawling robot that performs an inspection job. In some such embodiments, the UAV inspection mission is primarily monitored and controlled by an operator who flies the UAV to the vicinity of the target. It should be noted that while in some of these embodiments, the UAV has a releasable crawler, in some others of these embodiments, the UAV does not have a releasable crawler.

As discussed earlier, pipes and other curved surface structures can be especially challenging to inspect or maintain with a UAV, as these assets present curved surfaces with which to land and perch. In addition, these assets can be difficult to access during inspection jobs. Further, erecting scaffolding may not be practical or feasible to access some portions of the assets, at least by human operators. Moreover, when operating a UAV, human operators may lack the tools to properly perform a perching maneuver on a distant asset. For example, although an operator can have a first-person-view of the target using an onboard camera, human-level perception accuracy and precision can be inadequate for reliable perching, and the system's safety can be compromised, if done manually. In addition, autonomously landing a UAV on an inspection target such as a pipe is a technically challenging task.

Accordingly, in some example embodiments, a sophisticated system including one or multiple environment sensing devices, a smart guidance and landing technique, and an effective mechanical perching mechanism are used to achieve successful and robust landing maneuvers on elevated assets, such as pipes. For example, in order to increase the safety level as well as the accuracy and precision of the UAV perching maneuver, automated methods using onboard sensors, such as a depth camera and a laser scanner (LIDAR), are provided. In some embodiments, an onboard computer is used to process the sensors' measurements to accurately and precisely detect and localize the target with respect to the UAV, plan a perching path, and finally control the UAV to perform the perching step.

Figure 1B:
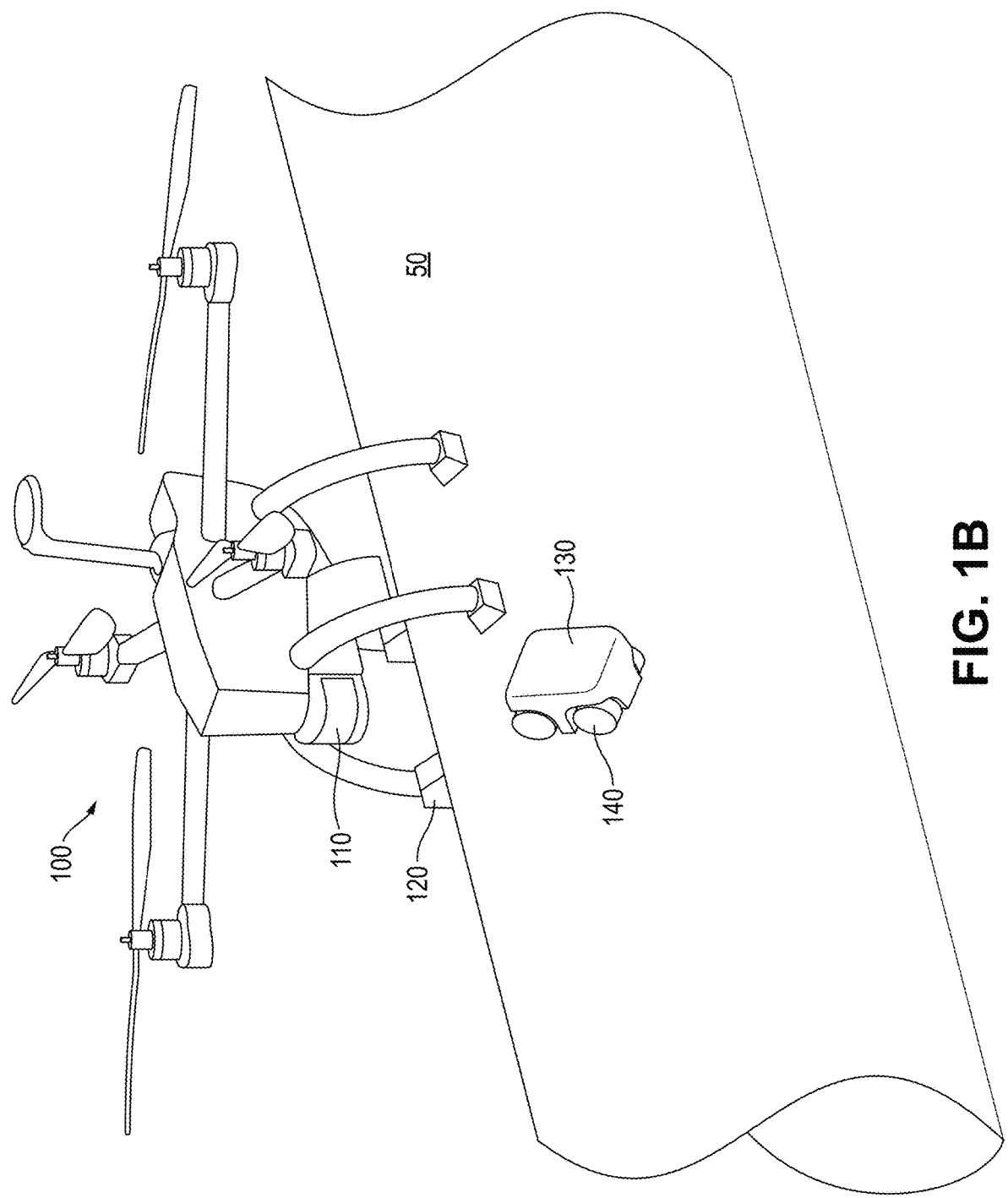

FIGS. 1A and 1B are illustrations of an example UAV 100 perching on a structure 50 (for example, a pipe), with the UAV 100 having a releasable crawler 130 for inspecting or maintaining the structure 50, according to an embodiment. The crawler 130 is shown attached to the UAV 100 in FIG. 1A and not attached to the UAV 100 (e.g., crawling on the structure 50) in FIG. 1B. For ease of description, it is assumed throughout that the structure 50 is larger (such as significantly larger) than the UAV 100. For example, the structure 50 is larger in every dimension than the UAV 100, or the structure 50 presents a larger footprint on which to land than the footprint of the UAV 100. In addition, it is assumed for ease of description that the structure 50 (or any structure described herein) is a pipe, such as an eight inch or larger diameter pipe.

FIGS. 1A and 1B show the mother-child configuration in action. FIG. 1A shows the UAV 100 after landing on the pipe 50 with the crawler 130 still docked in it. FIG. 1B shows the crawler 130 after being released from the UAV 100 to perform the inspection job. The crawling capability provided by the releasable crawler 130 gives the UAV 100 important features for inspection and maintenance jobs, such as easier accessibility (e.g., landing does not have to be on the exact spot where inspection or maintenance takes place). The crawling further provides for circumferential and longitudinal scans. For instance, in the oil and gas industry, it is important to perform full scans of the pipe 50 to find the minimum steel thickness on a certain area of the pipe 50. Such scans often include circumferential scans and longitudinal scans, for which crawling is well suited. The crawling further provides for power efficiency during multiple inspections (e.g., crawling between multiple inspection sites on the same pipe is more power efficient than flying).

In FIGS. 1A and 2B, the UAV 100 utilizes four articulated magnets 120 (such as permanent magnets or switchable permanent magnets). To accommodate the landing of the UAV 100 on the pipe 50, each of the magnets 120 (or more precisely, its magnetic field) articulates with a perpendicular orientation with respect to the pipe 50 when the UAV 100 has landed or is perching on the pipe 50.

In some embodiments, the magnetic fields of the articulated magnets 120 are actively switchable on and off (e.g., to allow for easy detachment after job completion). A laser scanner 110 (e.g., light detection and ranging, or LIDAR) is included in order to measure, for example, the pipe's relative location with respect to the UAV 100 during the automated landing maneuver as a form of real-time feedback. In some embodiments, the miniature crawler 130 is connected by a wire (e.g., for power and communication) and includes a UT sensor, four magnetic wheels 140, and two motors to drive the wheels 140 in corresponding pairs (e.g., front and rear). The wire also allows the rest of the electronics and batteries for carrying out the inspection or maintenance to be located in the main UAV body 100. This reduces the size, weight, and complexity of the crawler 130.

In some other embodiments, the crawler 130 includes a different number of wheels 140 (e.g., two or three wheels, or more than four) and their type (e.g., omniwheels, mecanum wheels, to name a few). Unlike an unmanned ground vehicle (UGV), the magnetic crawler 130 has to contend with various curvatures and various directions (as illustrated throughout) of pipe inspection or maintenance. As such, in some embodiments, the magnetic crawler 130 has special locomotion systems to navigate pipe curvatures (or similar curvatures from other curved structures or vessels).

In some embodiments, communication between the crawler 130 and the UAV 100 is wired. For example, using a small spool of a thin cord, the crawler 130 can be connected to the UAV 100 for power and communication. This can eliminate, for example, the need to host a battery and other electronics inside the crawler 130, making it smaller and saving total weight by utilizing some of the components already existing in the UAV 100.

In some other embodiments, communication between the crawler 130 and the UAV 100 is wireless. Here, the crawler 130 includes its own battery and electronics, to provide for a more standalone vehicle. This can be useful, for example, when the UAV 100 picks up the crawler 130 from the ground and deploys it on the pipe 50, at which point the UAV 100 can fly to do some other inspection jobs and then go back to pick the crawler 130 up. This can also be useful for numerous crawlers 130 (e.g., a swarm of crawlers 130) to inspect multiple assets, with the UAV 100 working on picking them up one-by-one or in batches from the ground towards their destination and retrieving them upon job completion. In different embodiments, the wireless connection can be between the crawler(s) 130 and either the UAV 100 or an operator's control station, or both the UAV 100 and the operator's control station.

In an embodiment, the UAV 100 includes a body constructed to enable the UAV 100 to fly (e.g., having rotors, control and guidance devices, and the like). The UAV 100 also includes three or more legs connected to the body and configured to land and perch the flying UAV 100 on a curved ferromagnetic surface 50. Each leg includes a top (or main) portion connected to the body, and a bottom portion that includes a permanent magnet 120. The bottom portion is configured to magnetically attach the leg to the ferromagnetic surface 50 during the landing and to maintain the magnetic attachment of the leg to the ferromagnetic surface during the perching. In addition, a passive articulation joint connects the top and bottom portions of the leg, and passively articulates (e.g., pivots) the bottom portion with respect to the top portion in response to the bottom portion approaching the ferromagnetic surface 50 during the landing. The UAV 100 further includes a releasable crawler 130 having magnetic wheels 140. The magnetic wheels 140 allow the crawler 130 to detach from the UAV 100 during the perching, and to maneuver the crawler 130 on the ferromagnetic surface 50 while magnetically attaching the crawler 130 to the ferromagnetic surface 50 after the detaching.

In different embodiments, different landing mechanisms of the UAV 100 can be used. These can include different types of adhesion mechanisms such as magnetic or non-magnetic. Examples of magnetic landing mechanisms include magnets that can be shut-off or overcome by a mechanical means during takeoff from the pipe 50. Such magnets include switchable permanent magnets, permanent magnets with an actuated leverage to aid in detachment during takeoff, electro-permanent magnets, and electromagnets. It should be noted, however, that continuous power consumption can be a disadvantage for electromagnets. Non-magnetic adhesion mechanisms can be used for non-ferromagnetic surfaces such as stainless steel, composite pipes, and concrete walls. Such mechanisms include microspines, dry gecko-inspired adhesives (e.g., synthetic setae), suction cups, grippers, and claws.

In different embodiments, different crawler payloads or designs are used. For simplicity, these payloads or designs fall into two basic categories: inspection and maintenance. Inspection payloads and designs include a range of different types of sensors that are often used in the oil and gas industry to inspect pipes and structures. For example, in some embodiments, a UT sensor is used for thickness measurement. For ease of description, a UT sensor for thickness measurement is used throughout at times to represent an example device and application for inspection and maintenance. However, other embodiments are not limited to such a device or application. For instance, other inspection sensors or probes can be used instead of or in addition to the UT sensor depending on the job, including (but not limited to) eddy current sensors and alternating current field measurement (ACFM) sensors.

In still other embodiments, the crawler 130 is configured with one or more tools and used for maintenance purposes. For example: the crawler 130 can be used to perform light maintenance jobs such as cleaning, surface preparation, and coating repairs. In still yet other embodiments, the crawler 130 is configured with one or more cameras and used for visual inspection. For instance, in some embodiments, a camera is used for simple visual inspection jobs, such as where only videos or photos of areas of interest need to be obtained, but for which the areas are difficult to inspect directly by the UAV 100.

In some embodiments, the crawler 130 is configured to leave markers (such as paint or QR codes) behind on areas of interest (such as locations where the sensor readings are outside of normal levels, or where faults are detected, or where conditions are normal but the locations are to be marked anyway). These locations, for example, can be where critical thickness levels are detected. In some such embodiments, after the crawler 130 re-docks and the UAV 100 flies away, the UAV 100 scans these markers and creates a 3D reconstruction of the environment showing the exact location of these markers. In some such embodiments, the UAV 100 uses an on-board RGB-D camera to detect the markers and compute their locations with respect to the UAV 100. Using the UAV's GPS position, absolute locations of the markers can be computed or otherwise determined. It should be noted that while the UAV 100 is scanning the markers, the crawler 130 can, for example, stay on the pipe 50 or be re-docked with the UAV 100.

In some embodiments, the crawler 130 uses wireless localization to identify problem (or other sensor reading) locations on the asset, such as with virtual markers. In other words, the locations of faults can be determined even without physical markers, albeit with less precision. This is because the crawler's location with respect to the UAV 100 can be computed (or otherwise determined) using wireless sensors. For example, in some such embodiments, the UAV 100 carries an ultra-wide band (UWB) sensor array that receives wireless signals for another UWB transmitter that is mounted on the crawler 130. The crawler's relative location can then be measured regardless of whether the UAV 100 is in flight or attached to the pipe 50. In some embodiments, whenever an operator finds a fault while crawling, the crawler location with respect to the UAV 100 is tagged and captured. With the UAV's GPS sensor, the absolute positions of these faults can be determined. In some embodiments, when GPS is not available, the UAV's location is estimated based on the flight trajectory and IMU data from its home base, where GPS is available. This also can be done using sensor fusion techniques such as visual inertial odometry (VIO), which fuses camera image and IMU data to compute a location estimation with respect to a reference point (e.g., home base).

In some embodiments, previously computed (or determined) inspection locations are transferred from the UAV 100 to an operator computer, or a ground station. Then, the inspection locations are visualized on, for example, a previously-built 3D model of the inspected plant, or a 3D model that can be constructed from the UAV's onboard sensors, e.g., depth camera or 3D LIDAR. In addition, in some such embodiments, the visualized locations are annotated with the corresponding measured thicknesses (or other sensed values or information).

FIG. 2 is a block diagram of an autonomous guidance and landing technique 200 for landing a UAV (such as UAV 100) on a curved surface (such as a pipe, as in pipe 50), according to an embodiment. This and other techniques described herein can be implemented using a combination of sensors and other devices including computing or other logic circuits configured (e.g., programmed) to carry out their assigned tasks. These devices are located on (or otherwise in close proximity to) the UAV. In some example embodiments, the control logic is implemented as computer code configured to be executed on a computing circuit (such as a microprocessor) to perform the control steps that are part of the technique. For ease of description, this processing logic (e.g., ASIC, FPGA, processor, custom circuit, or the like) will be referred to as a control circuit throughout. For further ease of description, this control circuit will be programmable by code to perform the control logic (or otherwise customize the circuit to perform its intended purpose).

Referring to FIG. 2, the autonomous guidance and landing technique 200 includes the step of taking in or otherwise receiving raw sensor data 210 from various environmental sensors including scanning sensors such as a 2D LIDAR system and a 3D or infrared (IR) depth camera. The control circuit is configured by code to process the sensor data 210 in order to produce actionable information by which the remainder of the technique 200 can be carried out, such as issuing control commands to the UAV to perform the delicate perching maneuver.

In further detail, the technique 200 includes the step of pipe detection and localization 220: In an embodiment, the control circuit is configured by code to process the data from the environmental sensors in order to identify and detect the target pipe as well as to find its location 230 with respect to the UAV. The technique 200 further includes the step of trajectory planning 240. In an embodiment, once the target's location 230 is identified, the control circuit is further configured to plan a full landing trajectory 250 from the current location to the desired landing location (e.g., on top of the pipe). The technique 200 further includes the step of control and trajectory following 260. In an embodiment, the control circuit is further configured to make sure the UAV is following the planned trajectory 250 during the landing maneuver and corrects and controls 270 the UAV for any disturbances and deviations from the landing trajectory 250 in real time. Further details of example implementations of these steps are provided below.

Figure 3B:
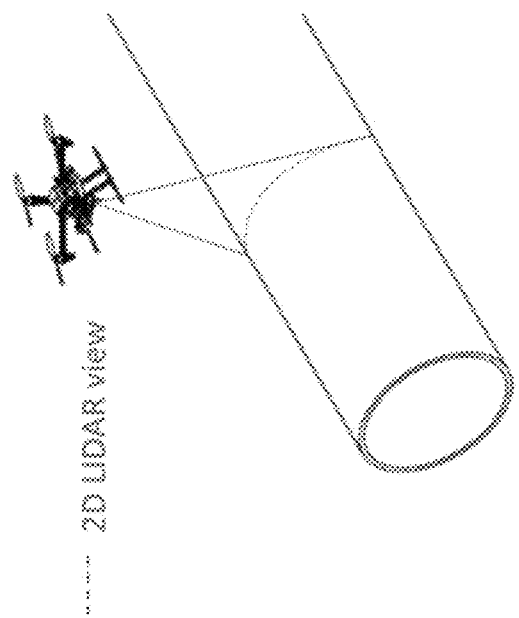
FIGS. 3A, 3B, and 3C are oblique views of example perching steps of a UAV to perch on a target structure (such as a pipe), including target approach, target alignment, and perching on the target, respectively, according to an embodiment.
Figure 3A:
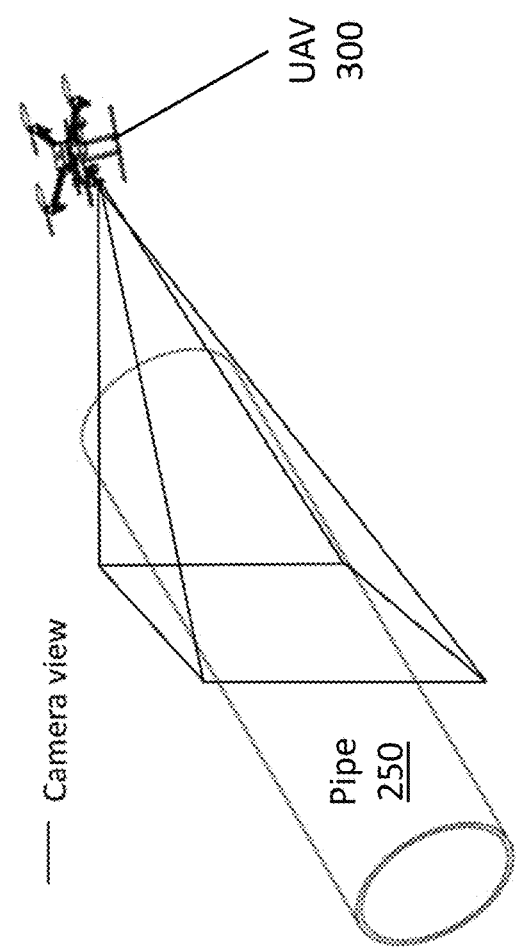
Figure 3C:
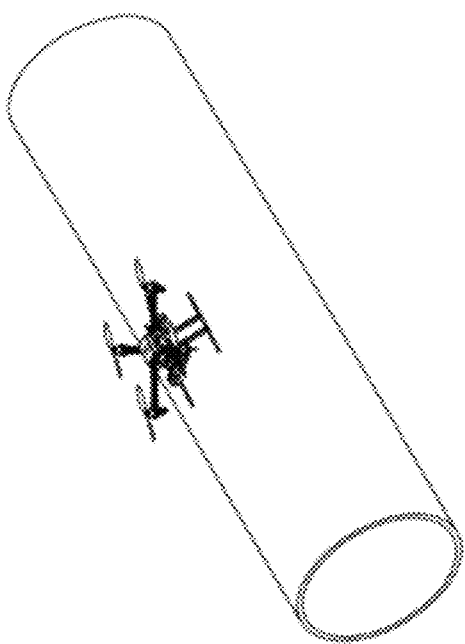

FIGS. 3A, 3B, and 3C are oblique views of example perching steps of a UAV 300 to perch on a target structure (such as a pipe 250), including target approach, target alignment, and perching on the target 250, respectively, according to an embodiment. FIG. 3A represents the target approach phase, when the UAV 300 is approaching the target 250 and deciding on an appropriate landing position. FIG. 3B represents the target alignment phase, when the UAV 300 is fine tuning the landing position (such as from above the target 250) to make the final descent (or other maneuver) as precise as possible. FIG. 3C represents the perching phase, when the UAV 300 has landed (and is now resting) on the target 250.

The UAV includes both a depth camera (e.g., 3D depth sensor) and a 2D LIDAR system. For ease of description, the depth camera acquires (or scans) a rectangular (2D) field of view (FOV) using pixels configured with depth sensors. Each pixel's depth sensor estimates the distance from the camera to the corresponding region in the FOV corresponding to the pixel. This provides the extra dimension (3D) in the depth camera's output data. For further ease of description, the 2D LIDAR acquires (or scans) a linear (1D) FOV using pixels configured with timing sensors. Based on timing differences between outgoing laser light from the 2D LIDAR and return light to the pixels, the 2D LIDAR estimates the distance (using the speed of light) between the 2D LIDAR and each pixel in the linear FOV. This provides the extra dimension (2D) in the 2D LIDAR's output data, which represents a 2D slice along the LIDAR scan direction. This is in contrast to a 3D LIDAR system, which acquires (or scans) a rectangular (2D) FOV using pixels configured with timing sensors. Such a system produces 3D output by adding the distance dimension for each corresponding pixel in the rectangular array.

Using these two sensors (a 3D depth camera and a 2D LIDAR system), there are different example embodiments of detection, localization, and alignment discussed herein. While perhaps in an ideal setup, a 3D LIDAR can be used to provide adequate accuracy and precision for continuous feedback of target pose estimation with respect to the UAV at all times, there are practical considerations. For example, with the current 3D LIDAR technology, only relatively large UAVs (e.g., greater than a meter in width) can provide sufficient payload to carry such a sensor. Such a large UAV would be impractical to land on a relatively small pipe (e.g., a pipe closer to 8 inches in diameter). This is in contrast to 3D depth cameras and 2D LIDAR systems, which are considerably lighter, even when considering the combined weight of a 3D depth camera and a 2D LIDAR system. In addition, with current 3D LIDAR technology, the cost of a 3D LIDAR system (not to mention the large UAV to carry the 3D LIDAR system) can be an order of magnitude greater than the cost of both a 3D depth camera and a 2D LIDAR system.

Accordingly, for practical considerations, a combination of a 3D depth camera and a 2D LIDAR system is considered for providing the UAV with the sensing data it needs to perform the autonomous detection, localization, alignment, and perching discussed herein. This provides for a relatively low cost and small payload system compared to the 3D LIDAR system. Put another way, in an attempt to relax some or most of the constraints on the UAV size and its payload capacity, the combination of a 3D depth sensor and a high-end 2D LIDAR is provided. The combined weight of both sensors can be much lighter than a high-end 3D LIDAR system. In addition, the cost of both sensors, compared to the 3D LIDAR system, is reduced by one order of magnitude. While the proposed sensor combination may not provide the same high precision and accuracy of the 3D LIDAR system, when using the example methods discussed herein, an adequate and comparable overall performance of the localization feedback for accurate and precise autonomous perching is provided.

With reference to the example embodiment of FIGS. 3A, 3B, and 3C, in this configuration, each sensor (3D depth camera and 2D LIDAR system) of the UAV 300 is used for the detection and localization at a certain distance range from the target pipe 250. For example, the depth camera is used to continuously detect and localize the target 250 from a relatively far distance. As soon as the UAV 300 gets close to the target 250 (e.g., less than a set or predefined distance, or within a proximity of the target 250), the 2D LIDAR system is used to detect, localize, and align the target 250 all the way until the perching is complete. As such, there are two zones: a distant zone (e.g., when the UAV 300 is relatively far from the pipe 250) for which the UAV 300 only uses the 3D depth camera for detection and localization, and a close zone (e.g., when the UAV 300 is relatively close to the pipe 250) for which the UAV 300 only uses the 2D LIDAR system for detection, localization, and alignment.

In such a setup, the 3D depth camera provides a 3D point cloud of the sensed surroundings, which helps to segment arbitrary target shapes in 3D, such as a pipe (e.g., pipe 250), which appears as a half-cylindrical shape in the 3D point cloud. This further helps estimate the 3D size of the target 250 and to select an appropriate landing point on the target 250. However, the depth camera becomes less reliable at closer distances to the target 250 and, therefore, can result in less reliable perching.

By contrast, the 2D LIDAR system provides more accurate proximity measurements (near the target 250) compared to the depth camera, where the pipe 250 appears to the 2D LIDAR as a 2D slice, such as a half circle, a half ellipse, or a straight or mostly straight line, depending on the angle of the 2D LIDAR scanner makes with respect to the pipe 250. This accuracy advantage of the 2D LIDAR is especially noticeable at very close distances from the target 250, where the depth camera becomes even less reliable. However, at far distances from the target 250, it can be challenging for the 2D LIDAR system to robustly detect the desired target 250 using only 2D (e.g., linear array of distance) measurements. This is due in part to the possibility of having other surrounding objects that have similar representations as the target 250 in the 2D representations, and the 2D slice does not have enough of the target 250 to differentiate it from such surrounding objects.

Therefore, by combining the two sensors, ambiguity of object detection and localization can be avoided by using a depth camera at far distances from the target 250, and accuracy and precision of alignment and perching can be improved by using a 2D LIDAR system at close distances to the target 250. In addition, processing power by the control circuit is reduced by consuming only one sensor's output in each of the two independent steps.

Figure 4:
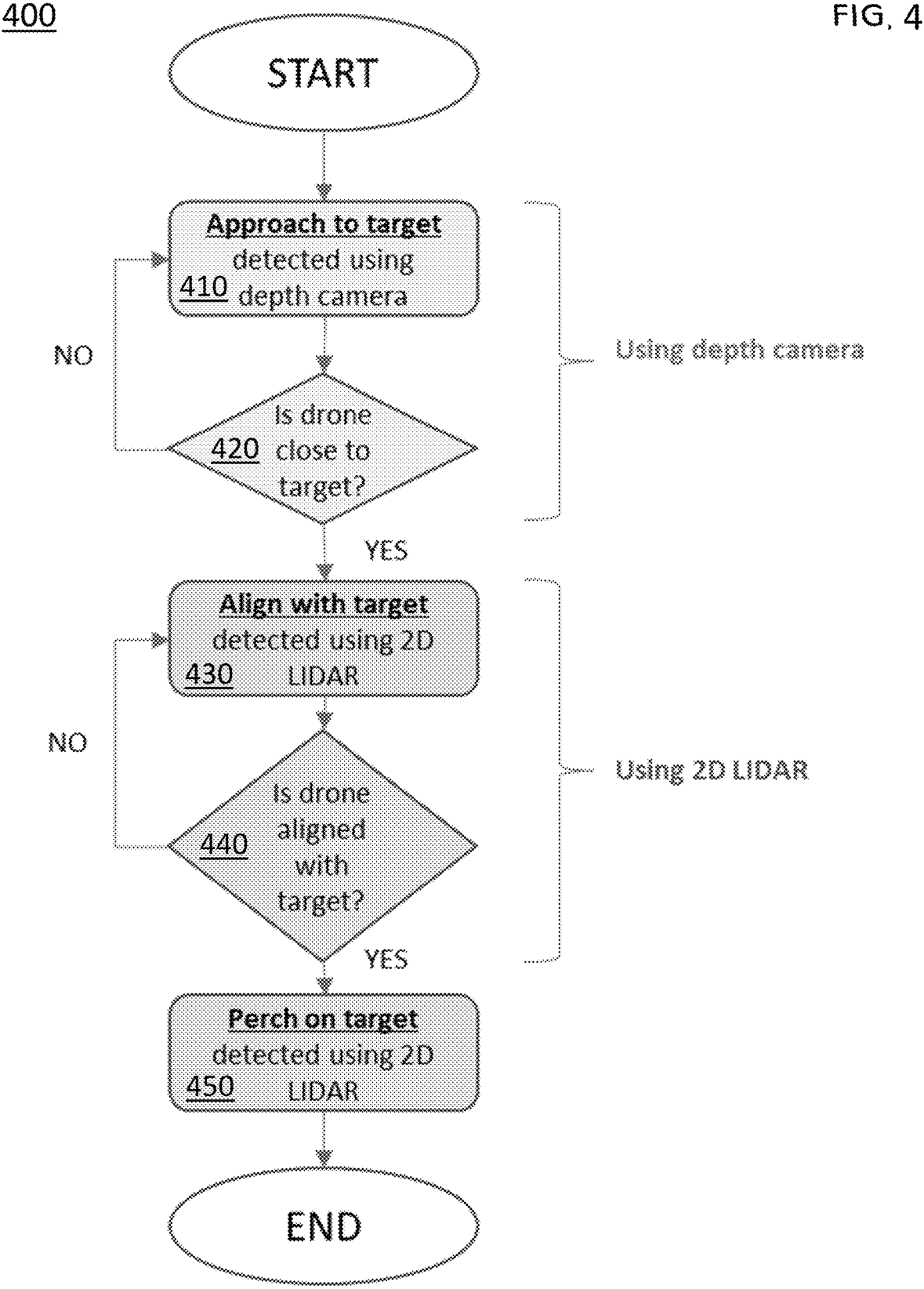
FIG. 4 is a flow chart of an example sequential path planning technique for autonomous deploying and landing of a UAV on a curved surface (such as a pipe), according to an embodiment.

FIG. 4 is a flow chart of an example sequential path planning technique 400 for autonomous deploying and landing of a UAV on a curved surface (such as a pipe), according to an embodiment. The path planning technique 400 of FIG. 4 uses a piece-wise trajectory approach, similar to that illustrated in the example target approach, target alignment, and perching on target of FIGS. 3A, 3B, and 3C, respectively. In this method, the control circuit is programmed to compute the UAV's trajectory at three different states using, for example, one or more of the target detection and localization methods discussed above. The three states are target approaching, target alignment, and perching on target, as illustrated in FIGS. 3A, 3B, and 3C, respectively. In other words, the complete perching trajectory is composed of these three parts, for which the control circuit is programmed to compute independently of each other.

With reference to the path planning technique 400 of FIG. 4, processing begins with the step of approaching 410 to the target. This is the first state in the autonomous perching mission, where the target is first detected and localized from a relatively far distance. Here, the control circuit is programmed to have the UAV first stay in a hover state at a predefined location away from the target. The control circuit is further programmed to receive an operator selection of an initial input image of the target for the detection and localization algorithms. For example, a user or operator can do this from a user interface by selecting a region of interest (ROI) that contains the target from the live image stream provided by the UAV's onboard camera. Next, the control circuit is further programmed to use the initial target input image and the input of an onboard depth camera to provide continuous detection and 3D localization of the target with respect to the UAV. From this, the control circuit is further programmed to use the calculated pose of the target (from the detection and localization) to compute a safe path (e.g. a straight line) for the UAV to follow in order to move closer to the target and prepare for alignment.

The technique 400 further includes the step of determining 420 if the UAV (or drone) is now close enough to the target (e.g., after travelling along the safe path and getting closer to the target). In an embodiment, the control circuit is further programmed to determine this state (approach to target) is complete once the UAV reaches, for example, a predefined location or a predefined distance from the target, at which the 2D LIDAR system has more visibility to the target. At that point, the 2D LIDAR system can perform more accurate localization (than the 3D depth camera) in preparation for perching on the target, and the approach to target state (when the depth camera is used for detection and localization) is over.

The technique 400 further includes the step of aligning 430 the UAV with the target that is now detected using the 2D LIDAR system. In this state, the control circuit is further programmed to only use 2D LIDAR measurements for detecting and localizing the target in order to optimize the UAV's orientation with respect to the target for accurate and precise perching. This can include moving the UAV to the proper location from which to perch on the target, such as directly above the pipe and within a predefined proximity of the pipe. To this end, the technique 400 further includes the step of determining 440 if the UAV is aligned with the target.

Here, the control circuit is further programmed to use the 2D LIDAR measurements to determine if the UAV is both close enough and in the proper orientation with respect to the target to actually perch on the target. If not, the control circuit is further programmed to continue using the 2D LIDAR measurements to further align the UAV with the target.

Once aligned with the target, the technique 400 further includes the step of perching 450 (e.g., the final landing maneuver) on the target using the 2D LIDAR measurements. After the UAV aligns itself with the target, the control circuit is further programmed to compute a safe trajectory towards the perching point (landing location on the target). In an embodiment, the safe path is characterized by the perching point on the target and the speed profile towards this point. The control circuit is further programmed to use the 2D LIDAR measurements for continuous feedback when controlling the UAV along the computed trajectory to safely land the UAV on the target.

Figure 5:
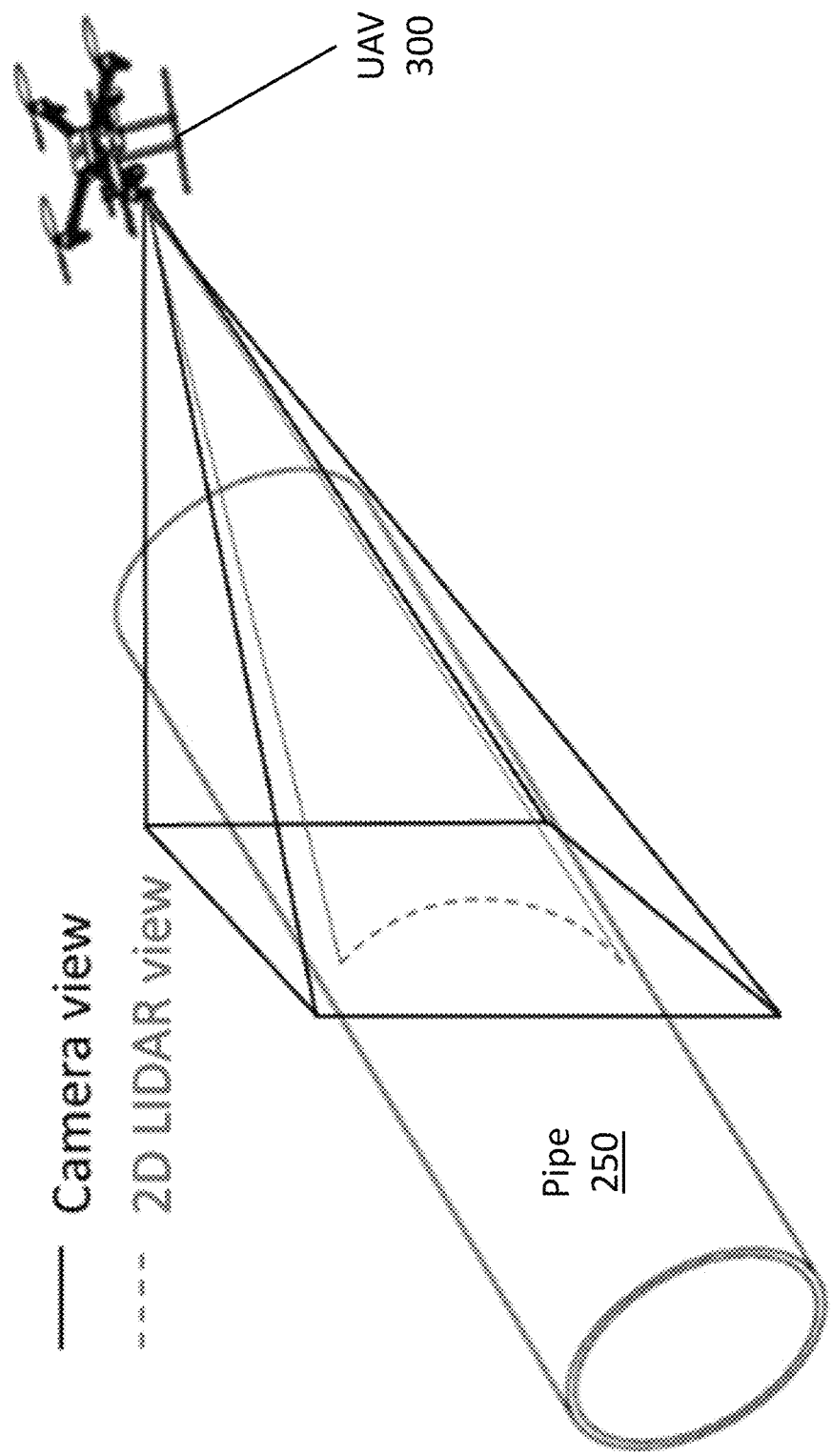
FIG. 5 is an oblique view of an example technique of target detection, localization, and alignment using sensor fusion, according to an embodiment.

FIG. 5 is an oblique view of an example technique of target detection, localization, and alignment using sensor fusion, according to an embodiment. For ease of description, pipe 250 and UAV 300 from FIGS. 3A, 3B, and 3C are used in the description of the example technique of FIG. 5, as the most significant differences are in the programming of the control circuit and the concurrent use of both the 3D depth camera and the 2D LIDAR system in the UAV 300.

In further detail, and with reference to FIG. 5, in this configuration, both the depth camera and the 2D LIDAR system are used concurrently (e.g., simultaneously) during the entire perching mission. In one such embodiment, a sensor fusion method that follows a coarse-to-fine approach is used. In this approach, the depth camera is used to robustly detect and localize the target 250, even though its distance accuracy is generally less than that of a comparable 2D LIDAR system. This is because the extra coverage provided by the 3D depth camera (a 2D FOV) and the ability to recognize a 3D shape (such as a pipe 250) using such an image is superior at larger distances, as the 2D LIDAR system (a 1D FOV) can present more challenges identifying the target 250 in the presence of other structures at such distances.

As illustrated in FIG. 5, the coarse-to-fine approach includes using the localization result from the depth camera (e.g., coarse localization) to constrain the search space of the 2D LIDAR measurements as the UAV 300 moves towards the perching point on the target 250. This constrained search space represents the portion of the depth camera FOV most likely to isolate the target 250 (or portion of interest of the target 250, such as the perching position). The 2D LIDAR measurements inside the constrained space are used to detect and localize the target 250 (e.g., fine localization), constraining both the size and direction (e.g., 1D scan) to perform the 2D LIDAR measurements.

In another such sensor fusion embodiment, the control circuit of the UAV 300 is programmed to use a Kalman-filter based sensor fusion scheme to make more robust localization estimates by fusing the independent estimations from each sensor (depth camera and 2D LIDAR) while accounting for the uncertainties in their respective measurements.

In the sensor fusion embodiments, both sensors' measurements are fused and used during the perching mission at all times. This is different from the embodiment illustrated in FIGS. 3A, 3B, and 3C, where each sensor's measurements are used in an independent step. Comparing the two basic approaches, with sensor fusion, localization accuracy is increased at all times and the UAV trajectory towards the perching point is smoother. However, with sensor fusion, the computation time is increased because both sensors' measurements are processed during the entire perching mission.

In the sensor fusion embodiments, the control circuit is programmed to compute a continuous perching trajectory (as opposed to the piece-wise trajectory of the sequential path planning technique of FIG. 4). Here, the control circuit is programmed to compute an initial continuous trajectory once the target is initially detected and localized using both the depth camera and the 2D LIDAR system. The control circuit is further programmed to characterize this continuous trajectory using the UAV's location at the first target detection, the perching point on the target, and the speed profile along the trajectory.

Although multi-sensor configurations provide more robust object detection, localization, and alignment by utilizing their unique features, there are scenarios where each sensor can also be used solely in the autonomous perching task. That is, in certain specialized scenarios, either a 2D LIDAR system or a 3D depth camera is sufficient to perform the autonomous detection, localization, and alignment of the perching. For example, a 2D LIDAR system can be solely used for robust target detection, localization, and alignment in a non-cluttered (or non-noisy) environment. Similarly, a 3D depth camera can be solely used to provide adequate detection, localization, and alignment of large targets.

What follows now is a description of example embodiments of detection and localization methods, as these are the most challenging aspects of the autonomous perching of a UAV on a curved structure. For ease of description, these methods are described from the perspective of programming the control circuit to process the sensor data to appropriately detect and localize the target. In addition, since much of this discussion is the practical application of detection and localization algorithms to the task of autonomously perching a UAV on a curved structure (such as a pipe), it is also to be understood that the implementation of steps of such algorithms is by way of programming the control circuit to perform the corresponding steps.

As mentioned earlier, target detection and localization are the most challenging tasks in the autonomous perching maneuver. This is because the accuracy and precision of the maneuver control are highly dependent on the accuracy and precision of the localization feedback. In example embodiments, different algorithms (as programmed on the control circuit) are discussed to perform this task using a depth camera or a 2D LIDAR system (or both). The depth camera and 2D LIDAR are two different types of sensors to sense the pipe and detect its location. Each uses a different approach to measure distances, and produces vastly different data from the other. As such, as discussed herein, localization approaches or algorithms are sometimes specialized to a particular type of one of these sensors.

The depth camera provides a volumetric representation (or a 3D point cloud), which includes distance measurements of sensed objects in the surrounding 3D environment as observed by a rectangular (2D) array of sensing pixels. On the contrary, the 2D LIDAR system provides a 2D point slice, which includes distance measurements of sensed objects along a line as observed by a linear (1D) array of sensing pixels. The point cloud from the depth camera can be used to perform segmentation and localization of an arbitrary 3D object. In contrast, 2D LIDAR measurements can only be used to detect 2D slices of these shapes. As such, arbitrary object detection and localization using only 2D LIDAR data is significantly more difficult and is especially sensitive to surrounding noise (such as similar objects or other sources of spurious signals, which are easier to filter with 3D depth data). The accuracy and precision of the target localization using a depth camera is considered adequate in the vicinity of the target, such as between 0.3 and 10 meters (m). However, the 2D LIDAR provides significantly more accuracy and precision at closer distances, especially at much closer distances, such as less than 0.05 m.

For ease of description, the described embodiments use algorithms designed to detect pipes or other targets of cylindrical shape, but similar concepts can be generalized in other embodiments to detect other curved surface targets, such as spherical or partial spherical shapes. Since the data output of a 3D depth camera and a 2D LIDAR system are considerably different, different algorithms for target detection and localization are provided for each type of sensor. More detailed descriptions of these algorithms is provided below and with reference to FIGS. 6 through 9. However, simpler descriptions are provided now.

Different embodiments for performing detection and localization using a 3D depth camera are presented. These include using object segmentation from a point cloud, using inertial measurement fusion, and using image-based object tracking for point cloud reduction. However, these are but examples, and others will be apparent in light of the present disclosure.

Regarding detection and localization using object segmentation from a point cloud, the main steps of this include receiving the point cloud from the depth camera, identifying a bounding box in the point cloud, performing object segmentation in the bounding box, estimating the location of the target's center, and repeating some or all of these steps using results of previous steps as well as new input point clouds. In further detail, the control circuit is programmed to receive a point cloud from the depth camera (e.g., process output data from the depth camera into a 3D point cloud). The control circuit is further programmed to identify an initial bounding box that contains candidate points representing the target (a pipe in this case) in the input point cloud. For example, this initial bounding box may be the entire point cloud, a previously determined portion from which to start, an initial estimate of the target area based on instrumentation (such as GPS, IMU, or the like) or user-defined bounding box, to name a few.

The control circuit is further programmed to perform object segmentation within the identified bounding box, in order to find all points that best fit a pipe's mathematical model (e.g., a cylinder). From this, the control circuit is further programmed to identify the segmented object most likely representing the intended target pipe (e.g., best match of predicted location and shape). At this point, the control circuit is further programmed to estimate the location of the target pipe's center with respect to the depth camera. In an embodiment, the centroid of the points identified as the target pipe is used for the pipe's center estimate. In the next iteration, when a new input point cloud is available, a new bounding box is defined around the centroid previously calculated, with further segmentation and updated centroid calculation. This is assuming that the target has not moved much from the previous location (e.g., a small motion assumption) with respect to the camera's FOV.

Regarding detection and localization using inertial measurement fusion, this is similar to the object segmentation from a point cloud embodiment just discussed, only the small motion assumption is relaxed. Instead, the control circuit is further programmed to receive further input, such as from an inertial measurement unit (IMU) that is rigidly attached to the depth camera (or otherwise measures the inertia or estimates the pose of the depth camera), to predict the location of the target (with respect to the depth camera's FOV) in the next iteration based on the previous estimated location. The new bounding box is constructed around the new IMU-based estimated location. The IMU can be used to predict fast motion or rotation of the UAV, allowing the small motion assumption to be relaxed and a more accurate bounding box predicted for the next iteration.

Regarding detection and localization using image-based object tracking for point cloud reduction, the control circuit is programmed to use image-based object tracking to constrain the input point cloud to one that corresponds only to the region of the tracked object in the image frame. In an embodiment, to account for failures in the image tracker, an IMU is used to predict the location of the object in the image frame and use that to re-initialize the image tracker once the object is lost.

Different embodiments for performing detection and localization using a 2D LIDAR system are presented. One such embodiment includes doing circle detection using clustering and a modified random sample consensus (RANSAC) algorithm. Here, the control circuit is programmed to use the modified RANSAC algorithm to make use of fast clustering of the 2D LIDAR distance measurements. Another such embodiment uses rejection of linear clusters. Here, the control circuit is further programmed (from the modified RANSAC embodiment) to remove points that represent linear (or almost linear segments) in the 2D LIDAR measurements. Yet another such embodiment uses temporal pipe position and diameter tracking. Here, the control circuit is programmed to use the position and diameter of an initially valid target detection and track the target in subsequent time frames instead of performing full detection each frame.

Still yet another such embodiment performs ellipse detection using RANSAC and Hough transform. While the above example 2D LIDAR detection and localization embodiments describe fitting a circle (an example 1D portion of a 2D LIDAR slice) to the input data, in this approach, the control circuit is programmed to fit an ellipse to the input points. This is because, depending on the LIDAR's orientation with respect to the target pipe, the resulting points can often be better represented by an ellipse than a circle. In addition, the ellipse can be used to compute the orientation angle (yaw) between the LIDAR and the pipe, which can be useful for UAV alignment with the pipe. This embodiment uses the RANSAC technique together with a Hough transform, and is more fully described below. Still other embodiments of 2D LIDAR detection and localization will be apparent in light of the present disclosure.

In further detail, a variety of localization techniques using a 2D LIDAR system are discussed throughout. 2D LIDARs are lightweight laser scanners that sweep a laser beam around at high rotational scanning speeds and measure the time of flight for the reflected laser from the environment back to the scanner. This allows the 2D LIDAR to provide a detailed 2D scan of all the objects and obstacles around the scanner as long as they are in line of sight and within the 2D LIDAR's specific range. Real-time scans are possible due to the fast scanning rate of LIDARs as well as the small bandwidth required to transmit a single scan due to the point cloud being a 2D one instead of a 3D point cloud.

Multiple algorithms for pipe localization using a 2D LIDAR system are further described. The different techniques each have strengths and weaknesses, depending on factors such as the environment in which they are deployed. The techniques include circle detection using clustering and a modified RANSAC approach, rejection of linear clusters, temporal pipe position and diameter tracking, and ellipse detection using RANSAC and Hough transform.

FIG. 6 is a flow chart of an example circle (e.g., pipe) detection technique 600 using clustering of 2D LIDAR sensor data, according to an embodiment. The technique 600 detects and localizes a pipe from 2D LIDAR data with high accuracy using a heavily modified RANSAC approach that makes use of clustering. The control circuit is programmed to perform fast clustering by sorting the point cloud angularly.

Referring to FIG. 6, processing begins with the step of clustering 610 consecutive points closer than 5 centimeters (cm) apart and ignoring any cluster with fewer than some specified number (say n) points. In this step, the control circuit is programmed to cluster nearby points, and consider only such clusters that reach a certain threshold size. For example, in one embodiment, the control circuit is programmed to calculate the distance between every two consecutive points in the linear scan, and to cluster those points that are less than 5 cm apart together. The control circuit is further programmed to neglect any cluster that has less than a certain threshold number n of points and keep other clusters as eligible.

The technique 600 further includes running the modified RANSAC, which encompasses the remaining steps 620 through 680, for an arbitrarily large number of iterations (e.g., depending on factors such as processing power available, the size of the point cloud, the desired accuracy, and the like). More specifically, the technique 600 includes the step of fitting 620 a circle through three random points in a random eligible cluster. The goal is to quickly find a circle (e.g., pipe slice) that characterizes the other points in the cluster. Here, the control circuit is programmed to randomly select an eligible cluster, and from that cluster, randomly select three points in that cluster and fit a circle through them.

The technique 600 further includes the step of calculating 630 the algebraic error of all other points in the selected cluster from the circle using the circle's equation. This provides a measure of how well the cluster fits the circle. Here, the control circuit is further programmed to calculate or otherwise determine the algebraic error of all the other points in that cluster when plugged into the circle's equation. The technique 600 further includes the step of counting 640 the number of inlier points in the cluster that are close to the circle. Here, the control circuit is further programmed to find the number of inlier points with error less than a predefined threshold (e.g., close to the circle). The technique 600 further includes the step of determining 650 if the number of inliers is greater than the number of cluster threshold size n. This provides a confidence that the cluster is actually a circle (e.g., pipe). Here, the control circuit is further programmed to compare the number of inliers to the threshold n, and if it is smaller, the cluster (or point selection within the cluster) is not a good fit to a circle (pipe), so the process is reiterated starting with step 620.

Otherwise, the number of inliers exceeds the threshold n, and the technique 600 further includes the step of fitting 660 a best new circle through all the inliers and calculating the total residual error. Here, the control circuit is further programmed to find the best-fit circle through all the inlier points and find the error with respect to the best fit circle. The technique 600 further includes the step of determining 670 if the new circle is better (e.g., smaller error) than the previous best circle. The goal is to find the best circle (e.g., pipe) that fits the available 2D LIDAR data. Here, the control circuit is further programmed to compare the total residual error of the latest circle/cluster fit, and if it is not less than that of the best circle/cluster fit found in previous iterations, then a new best circle has not been found, so the process is reiterated starting with step 620.

Otherwise, a new best circle has been found, so the technique 600 further includes the step of saving 680 the new circle as the best circle. Here, the control circuit is further programmed to store the new circle as the best circle in an electronic storage medium for comparison with later candidate circles, and to reiterate the process starting with step 620 in search of a still better circle. The iterations stop when some termination criteria has been met (e.g., number of iterations, amount of compute time, residual error is below a predefined threshold, or the like). This technique works well when the UAV is close enough to the target pipe that the pipe dominates the clusters observed in the scanning line. As the relative size of the pipe shrinks or the amount of other structures (especially other curved structures) increases, the reliability of this technique to detect and localize the target pipe drops dramatically.

In another technique of 2D LIDAR detection and localization, rejection of linear clusters is performed. Here, the objective is to avoid the pitfalls of the wrong detections in the modified RANSAC algorithm above by first identifying which clusters are simply line segments and then ignoring them from the search. Once they are removed, the modified RANSAC can then be initiated. There are many ways to do this. For example, in one embodiment, the control circuit is programmed to fit a least square line through each segment (or cluster) and then study their total residual errors. In another embodiment, the control circuit is programmed to perform principal component analysis (PCA) on each cluster and study their second eigenvalues. Small second eigenvalues indicate a flat cluster (e.g., a line segment) while larger second eigenvalues (e.g., nonlinear clusters) might be good candidates for RANSAC. In yet another embodiment, the control circuit is further programmed to find the average gradient change in each cluster and use it as indication of cluster straightness. The control circuit is further programmed to discard those clusters whose straightness is above a predefined threshold.

In yet another technique of 2D LIDAR detection and localization, temporal pipe position and diameter tracking is performed. For instance, this technique can be used in conjunction with the clustering and modified RANSAC embodiment discussed above. The idea here is to utilize the information discovered about the pipe in one frame (e.g., 2D LIDAR snapshot) to assist in its search in the next frame. In one such embodiment, the control circuit is programmed such that, if a pipe is found in one frame, the search space is restricted in the next frame to be limited within the vicinity of the pipe's location in the first frame. This assumes slight UAV movements from one frame to the next, which is a valid assumption in the particular application. However, care must be taken to avoid wrong detections (false positives), which can cause the search window to shift away from the true pipe location. This can lead to divergence and failure to snap back to the true location again.

As such, in another such embodiment, the control circuit is further programmed to use the pipe diameter detected in the first frame as the likely truth and then only accept circles in future frames that have diameters within a certain tolerance of that. This vastly improves the algorithm performance and reduces false positives.

In still yet another technique of 2D LIDAR detection and localization, ellipse detection using RANSAC and Hough transform is performed. While fitting a circle to the 2D LIDAR output is one approach to detecting pipes in a 2D LIDAR scan, it assumes that the scan slice is perpendicular to the target pipe's longitudinal axis. In general, however, this will only be true once the target pipe's longitudinal axis has been located, and the 2D LIDAR scan adjusted accordingly. Otherwise, the 2D LIDAR slice will likely fit an ellipse instead. Put another way, if the UAV is pointing directly towards the pipe and perpendicular to it, the pipe will look like a segment of a circle in the 2D LIDAR scan. However, if the UAV turns (yaws) right or left by a slight angle $\theta$, then the pipe will no longer show up as a perfect circle segment but rather as a segment of an ellipse. The eccentricity of the ellipse is directly related to the yaw/azimuth angle $\theta$ of the UAV with respect to the pipe.

More formally, the minor axis length of the ellipse is always equal to the pipe diameter D as long as the UAV is level and pitching. Non-zero pitch angles could be compensated for by measuring the angle through the UAV's IMU and rotating the LIDAR data points by that angle. The relationship between the UAV yaw angle $\theta$ and the major axis length L is characterized as follows: $\theta=\arccos(D/L)$. Therefore, in an embodiment, the control circuit is programmed to fit an ellipse to the 2D LIDAR data using the pipe points in the LIDAR data, and then extract the corresponding major and minor axis lengths to identify the pipe diameter and the UAV's yaw angle. In another embodiment, the control circuit is further programmed to use a Hough transform to make the 2D LIDAR data less sensitive to noise when using RANSAC to find the best ellipse. Care should be taken, however, to prevent the large search space dimensionality from dominating the computation time and leading to unacceptable performance.

A variety of localization techniques using a 3D (such as an IR) depth camera are discussed throughout. A depth camera is a good candidate to detect and localize a straight pipe in a point cloud generated by the depth camera. The point cloud is a discrete volumetric representation of objects in 3D space. Object detection and tracking are studied as part of computer vision research of 2D image processing. Although images provide a rich source of features of the captured scene, it is challenging to localize and estimate the 3D pose of objects using monocular cameras. The main challenge comes from depth estimation. Stereo cameras can provide some relief at the expense of more computations and with limited ranges. 3D LIDAR systems provide a volumetric representation of the sensed environment, which makes object localization easier and more accurate. However, existing 3D LIDAR devices are not feasible to use for certain applications such as aerial applications where a small UAV is to be used, due to the 3D LIDAR's relatively heavy weight.

Depth cameras thus provide a low-cost tradeoff solution between stereo cameras and 3D LIDAR systems. Depth cameras, often called RGB-D cameras, combine a regular RGB camera and IR sensors to provide RGB images as well as the estimated depth for each pixel. The depth image can be converted to a point cloud, which provides a volumetric representation of the sensed environment. 3D LIDAR devices can generally provide more accurate point clouds compared to depth cameras. However, with some filtering techniques, which are discussed further below, point clouds generated by depth cameras can be adequate for autonomous perching as discussed herein. Nowadays, there are several low-cost depth cameras that are small enough to be mounted on small UAV's, e.g., the Intel RealSense D435 camera.

Various techniques to perform pipe detection and localization in a point cloud and estimate its pose are provided. Here, the pose is a six degree of freedom (6-DOF) pose, namely, a 3D position of the pipe's centroid and the 3D rotation angles of its axis. The techniques include: point cloud filtering, pipe segmentation, and pipe tracking.

In example point cloud filtering embodiments for 3D depth camera output, the raw input point cloud is generally dense and contains noisy measurements due to sensor inaccuracy and environmental conditions. Therefore, it can be useful to apply some filtering to the raw input point cloud in order to get more accurate object segmentation results. Two such filters include cropping and down sampling. These filters can be applied, for example, before performing cylinder segmentation. They can also be applied singly or together (where their effects compound). They can also be applied before other techniques, such as cylinder (e.g., pipe) segmentation.

In an example cropping embodiment, only objects near the sensor are of interest and the further points are less likely to be useful. For example, the input point cloud may contain data up to 10 meters away from the sensors, but only up to 5 meters depth is sufficient to image the objects of interest. Accordingly, the control circuit is programmed to crop those data points further than 5 meters away. This helps to reduce the noise and number of outliers, which improves the accuracy of object segmentation. In addition, it helps reduce the segmentation time significantly as the number of points to be processed is reduced. In a similar fashion, in an example down sampling embodiment, the control circuit is programmed to down sample the input point cloud. This type of filtering also reduces the size of the input point cloud, which speeds up further processing, and can be useful in computation-bound (e.g., real time) environments, such as automated perching.

In example pipe segmentation embodiments, the control circuit is further programmed to perform object segmentation after the input point cloud is filtered. There are many ways to do object segmentation in a point cloud including, for example, region growing, min-cut graph, difference of normal, Euclidean distance-based clustering, and model fitting using random sampling consensus (RANSAC). For brevity of discussion, this disclosure will focus primarily on model fitting using RANSAC. RANSAC is an iterative method to estimate parameters of a mathematical model from a set of observed data that contains undesirable outliers. Therefore, RANSAC also can be described as an outlier detection method. This method is practically useful because real field data contains measurements of other structures surrounding the target object in addition to other measurement noises that are considered outliers.

In general, a pipe can be represented by a cylinder model that can be parametrized by three model parameters, namely a radius of the cylinder, a point (three coordinates) on the central axis of the cylinder, and an orientation or 3D rotation (three angles) of the central axis with respect to an origin. The main mechanism of the RANSAC algorithm is discussed as follows. A model of the object is defined. In this case, a cylinder model with the aforementioned parameters (radius, central axis point, orientation of central axis). A distance function is defined to measure how far a point is from a fitted model. In an embodiment, Euclidian distance serves as the distance function.

At each time step t, an input data frame is provided, which is the input point cloud Pt at time t. In an embodiment, the control circuit is programmed to iteratively run the RANSAC technique up to a predefined maximum number of iterations. In each iteration, the control circuit is programmed to estimate the cylinder model parameters by model fitting, and the model accuracy is calculated using the defined distance function. The control circuit is further programmed to continue running the RANSAC technique and output the best model fit (model parameters) across all iterations with the maximum accuracy. These steps are applied for each input point cloud Pt.

In some embodiments, the open project Point Cloud Library (PCL) is used to provide several functionalities for point cloud filtering including an implementation of cylinder segmentation using RANSAC. In one such embodiment, PCL is used to perform point cloud filtering and cylinder segmentation. While point cloud filtering and pipe segmentation using RANSAC work well most of the time to detect and localize the target pipe, at times they can fail, such as when the input data has enough noise that a spurious noisy segment appears to be the best segment, or when there are two cylinders in the input data, and the technique identifies the wrong one. Accordingly, in some embodiments, to reduce the falsely detected pipes and to reduce the ambiguity of detection in the presence of other pipes, pipe tracking mechanisms are proposed.

FIG. 7 is a flow chart of an example neighborhood-based pipe detection technique 700, according to an embodiment. Processing begins with the step of performing 710 cylinder detection using RANSAC, followed by the step of selecting 720 a valid cylinder and updating a current valid centroid to be the centroid of the valid cylinder. Here, the control circuit is programmed to perform the cylinder detection on the input 3D depth camera data (point cloud) using RANSAC, and once a valid detection (e.g., possible pipe or cylinder) is available, the selected cylinder is selected as the initial candidate for detection in the next frame and the centroid of the valid cylinder is computed. The technique 700 further includes the step of cropping 730 the next input cloud around the previous valid centroid. Here, the control circuit is further programmed to make a small motion assumption with the depth sensor between consecutive input clouds, and crops the next input cloud around the previously computed valid centroid.

The technique 700 further includes the step of applying 740 a RANSAC-based segmentation to the cropped cloud and computing the centroid of the resulting cylinder (or cylinder cloud of data points). At this point, the technique 700 includes the step of determining 750 if the new centroid is in the neighborhood of the previous one, and if not, the previous valid centroid is maintained and processing resumes with step 730. In an embodiment, the control circuit is programmed to determine if the distance between the previous centroid and the new centroid is less than or equal to a predefined neighboring distance d, and if not, it is considered an invalid detection, and the valid centroid is not updated with the new centroid. Otherwise, the previous centroid and the new centroid are neighbors (e.g., within the neighboring distance d), and the technique 700 further includes the step of updating 760 the current valid centroid to be the new centroid. Processing resumes with the step of cropping 730 around this new centroid.

It is important to note that the success of this tracking mechanism is highly dependent on the small motion assumption (e.g., the centroids of the selected cylinders in consecutive frames stay close to one another). Accordingly, in some embodiments, in order to further improve the detection robustness in the presence of rapid motion, a sensor fusion mechanism is employed. In some such embodiments, the sensor fusion mechanism uses a Kalman filter.

Figure 8:
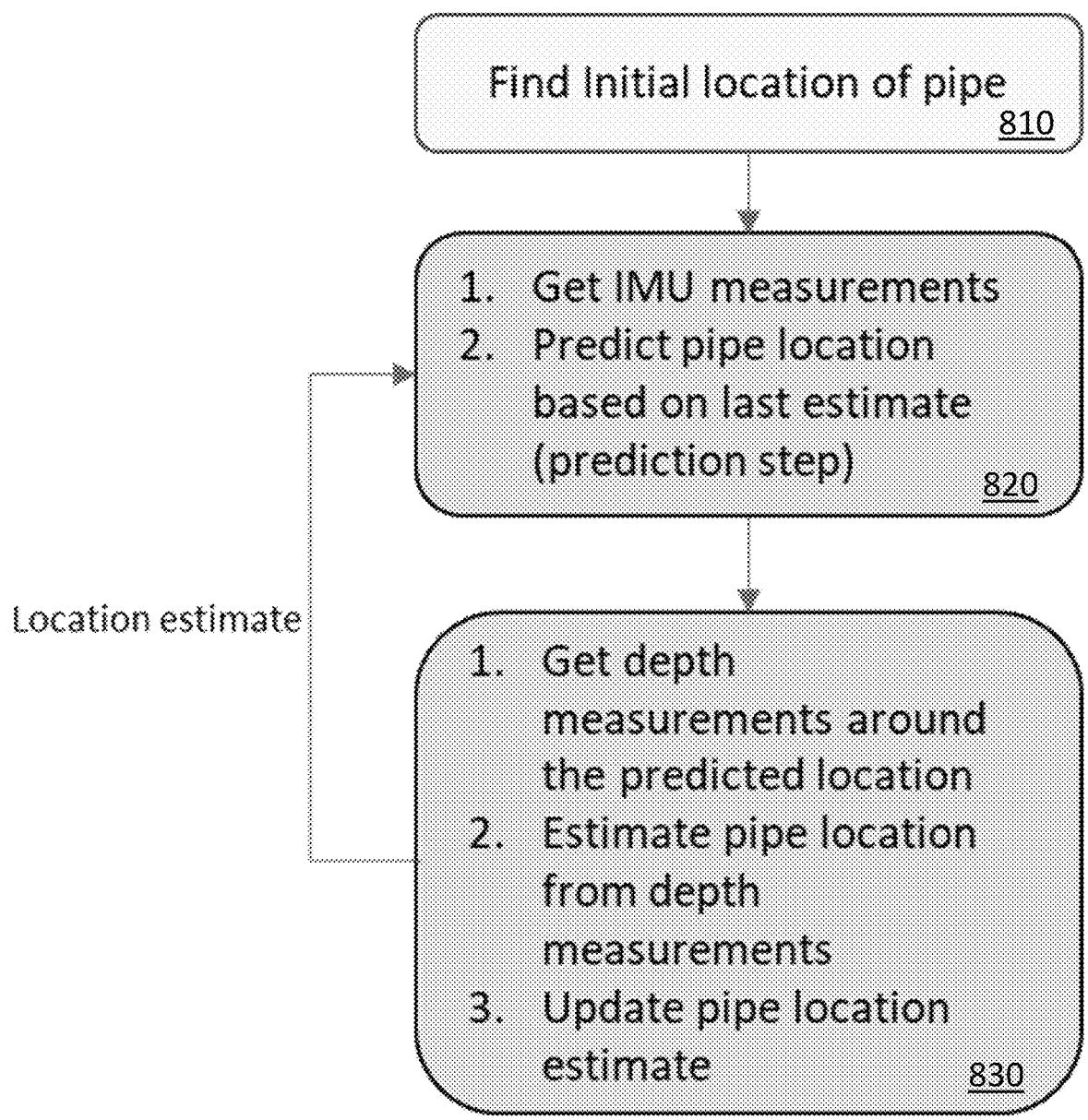
FIG. 8 is a flow chart of an example pipe localization technique based on a Kalman filter framework, according to an embodiment.

FIG. 8 is a flow chart of an example pipe localization technique 800 based on a Kalman filter framework, according to an embodiment. This technique helps improve the pipe detection and localization of earlier described techniques. Here, an inertial measurement unit (IMU) that is rigidly attached to the depth camera is used to provide more accurate prediction of a detected target even in fast motion. Using this prediction, a RANSAC-based segmentation is applied to the predicted location of the pipe's point cloud, which is a subset of the input point cloud.

Referring to FIG. 8, processing begins with the step of finding 810 the initial location of the pipe. In an embodiment, the control circuit is programmed to receive or determine the location and orientation of the depth camera (or UAV), and from this and the initial pipe location (using RANSAC), determine the initial location of the pipe. Once the initial location of the pipe is known, the technique further includes the step of getting 820 the IMU measurements and fusing them with the last estimate of the pipe location to predict the next location of the pipe in the depth camera's FOV. Here, the control circuit is programmed to perform the fusion of the IMU measurements and previous pipe location estimate in a Kalman filter framework. In a Kalman filter framework, there are two steps, a prediction step followed by an update step. The IMU measurements are used in the prediction step to predict the pose of the IMU (or of the depth camera that is attached to it) in space. The prediction can be done with acceptable accuracy over a short time period before it starts to diverge. This completes the prediction step 820.

The technique 800 further includes the step of getting 830 depth measurements around the predicted location, estimating the pipe location from these depth measurements, and then updating the pipe location estimate. Here, the control circuit is further programmed to update the location estimate of the pipe by using a subset of the input point cloud for the next frame that is around the predicted location (from step 820) to find and localize the pipe in the next frame. The estimated pipe location in this subset point cloud is then used in the update step 830 to correct the predicted location and to avoid divergence. This completes the update step 830. The framework proceeds iteratively repeating the prediction step 820 and the update step 830 to better track the pipe using sensor fusion to account for movement of the depth camera during the flight of the UAV.

Figure 9:
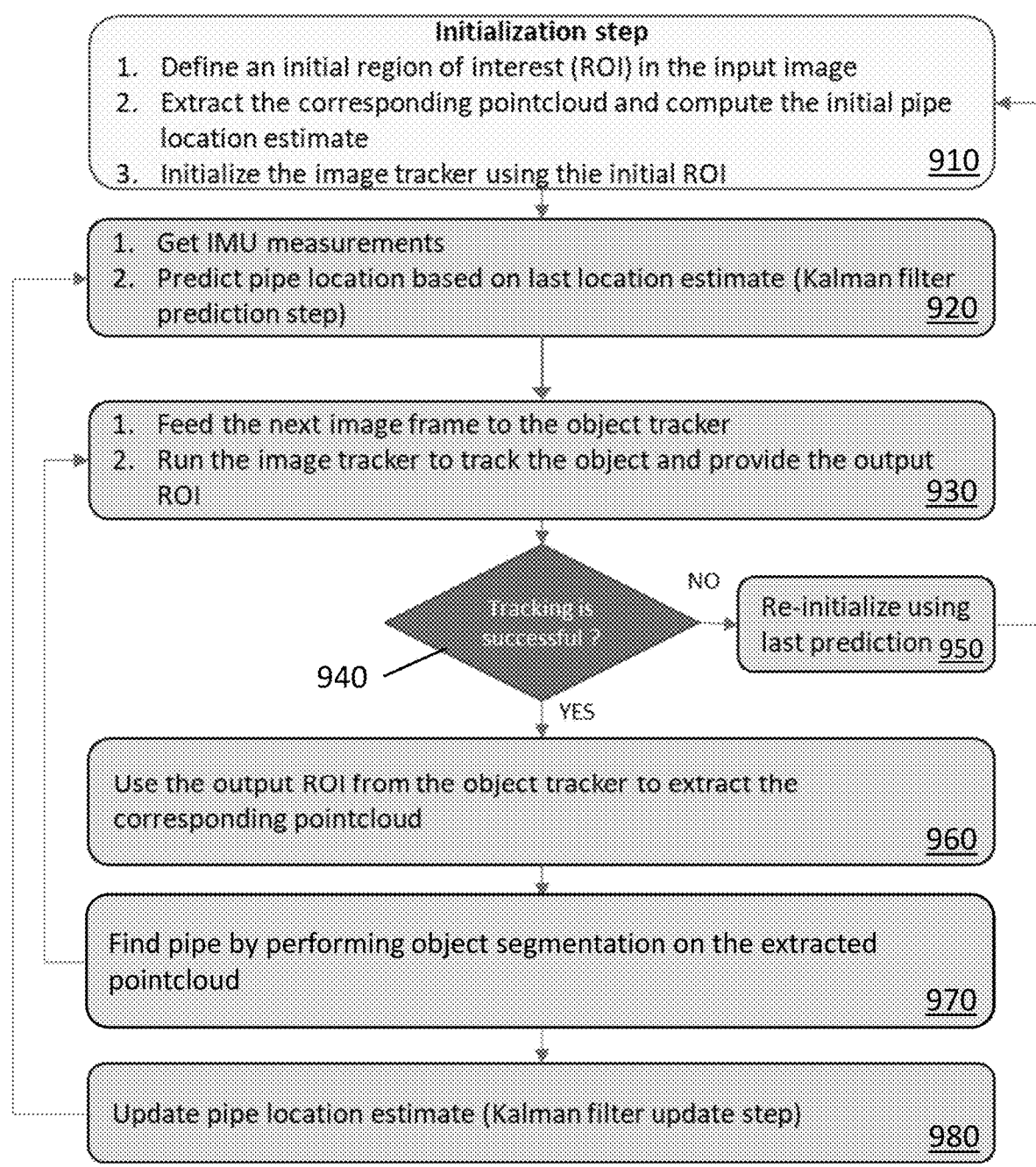
FIG. 9 is a flow chart of an example pipe localization technique using image tracking and a Kalman filter, according to an embodiment.

FIG. 9 is a flow chart of an example pipe localization technique 900 using image tracking and a Kalman filter, according to an embodiment. In the technique 900, adding one more source of object tracking helps improve the tracking robustness. An image-based object tracking is used to track the pipe seen by the RGB camera, which is embedded in the depth (e.g., RGB-D) camera. The corresponding point cloud is extracted from the original input point cloud. The size of the extracted point cloud is potentially much less than the original one, which results in much less computations associated with object segmentation. Image-based object tracking can fail during fast motion. In order to mitigate this issue, the IMU-based location prediction is also used in order to automatically re-initialize the image-based object tracker.

In further detail, processing begins with the initialization step 910, where the control circuit is programmed to receive or otherwise determine or define an initial region of interest (ROI) in the input image, extract the corresponding point cloud and compute the initial pipe location estimate (e.g., using RANSAC), and initialize the image tracker using the initial ROI. The technique 900 further includes the Kalman filter predication step 920, where the control circuit is further programmed to obtain the IMU measurements and predict the pipe location based on the last location estimate of the of the pipe. The technique 900 further includes the image tracking step 930, where the control circuit is further programmed to feed the next image frame (from the RGB camera) to the object tracker, and the image tracker is run to track the object and provide the output ROI. At this point, the technique 900 further includes the step of determining 940 if the object tracking was successful, and if not, then the technique 900 further includes the step of reinitializing 950 the image tracker using the last prediction and resuming with the initialization step 910.

Otherwise, the tracking is successful, and the technique 900 further includes the step of extracting 960 the corresponding point cloud using the output ROI from the object tracker. The technique 900 further includes the step of finding 970 the pipe, where the control circuit is further programmed to perform object segmentation on the extracted point cloud to find the pipe. The image tracker step 930 is then re-executed with the newly found pipe. Concurrent with this object tracking, the technique 900 further includes the Kalman filter update step 980, where the control circuit is further programmed to update the pipe location estimate from the depth measurements, at which point the Kalman filter prediction step 920 is repeated with the new IMU data.

In some embodiments, the depth camera and 2D LIDAR sensors are also used for obstacle detection and avoidance, such as when autonomously controlling the flight path of the UAV from a starting position to the landing position on the target surface. In one such embodiment, when the operator is manually flying the UAV towards the intended target, other pipes or structures may be encountered. Here, the sensors can detect these obstacles and the control circuit can be programmed to avoid collision by stopping the UAV and alerting the operator to take a different path. In another such embodiment, when the UAV is autonomously performing the landing maneuver on the pipe, it might detect obstacles in the vicinity and the control circuit is programmed to avoid them by planning a path around them.

FIG. 10 is a flow chart of an example method 1000 of autonomously perching a UAV (such as UAV 100 or 300) on a curved surface (such as pipe 50 or 250) from a starting position away from the curved surface, according to an embodiment.

Some or all of the method 1000 can be performed using components and techniques illustrated in FIGS. 1A through 9. Portions of this and other methods disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a single board computer (SBC), a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 1000 (or other disclosed method) to be carried out. It should be noted that in other embodiments, the order of the operations can be varied, and that some of the operations can be omitted. Some or all of the method 1000 can also be performed using logic, circuits, or processors located on a UAV configured to carry out the method 1000.

In the example method 1000, processing begins with the step of capturing 1010 and outputting 3D point clouds of scenes from the UAV. The images include the curved surface. The capturing uses a three-dimensional (3D) depth camera (such as an IR depth camera or RGB-D camera) attached to the UAV. The method 1000 further includes the step of capturing 1020 and outputting 2D slices of the scenes. This capturing uses a 2D LIDAR system attached to the UAV. The method 1000 further includes the step of controlling 1030 the depth camera and the LIDAR system to capture the 3D point clouds and the 2D slices, respectively, of the scenes. This can be done using a control circuit (e.g., programmable processor or logic circuit) attached to the UAV and programmed to carry out the controlling tasks.

The method 1000 further includes the step of inputting 1040 the captured 3D point clouds from the depth camera and the captured 2D slices from the LIDAR system. Here, the control circuit can be programmed to input the sensor data. The method 1000 further includes the step of autonomously detecting 1050 and localizing the curved surface using the captured 3D point clouds and the captured 2D slices. Here, the control circuit can be programmed to use RANSAC to perform and the detection and localization. The method 1000 further includes the step of autonomously directing 1060 the UAV from the starting position to a landing position on the curved surface based on the autonomous detection and localization of the curved surface. Here, the control circuit can be programmed to autonomously control the flight path of the UAV from the starting position to the landing position using the 3D point clouds and 2D slices to guide it.

In an embodiment, the curved surface is ferromagnetic and the UAV further includes magnetic legs. The method 1000 further includes the step of magnetically attaching the magnetic legs to the ferromagnetic curved surface during the landing and remaining magnetically attached to the ferromagnetic curved surface after the landing.

The methods described herein may be performed in part or in full by software or firmware in machine readable form on a tangible (e.g., non-transitory) storage medium. For example, the software or firmware may be in the form of a computer program including computer program code adapted to perform some or all of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing, and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An unmanned aerial vehicle (UAV) for autonomously perching on a cylindrically curved surface from a starting position away from the cylindrically curved surface, the UAV comprising:
    a three-dimensional (3D) depth camera configured to capture and output 3D point clouds of scenes from the UAV comprising the cylindrically curved surface;
    a two-dimensional (2D) light detection and ranging (LIDAR) system having a one-dimensional (1D) field of view (FOV), in contrast to a 3D LIDAR system having a 2D FOV, the 2D LIDAR system being configured to capture and output 2D slices of the scenes;
    a perching mechanism configured to mechanically perch the UAV on the cylindrically curved surface; and
    a control circuit configured to:
        control the depth camera and the 2D LIDAR system to capture the 3D point clouds and the 2D slices, respectively, of the scenes;
        input the captured 3D point clouds from the depth camera and the captured 2D slices from the 2D LIDAR system;
        autonomously detect and localize the cylindrically curved surface using the captured 3D point clouds and the captured 2D slices;
        autonomously direct the UAV from the starting position to a landing position on the cylindrically curved surface based on the autonomous detection and localization of the cylindrically curved surface; and
        autonomously control the UAV to perch the UAV on the cylindrically curved surface at the landing position using the perching mechanism.

2. The UAV of claim 1, wherein the control circuit is further configured to:
    use the captured 3D point clouds to perform the autonomous detection and localization from the starting position while autonomously directing the UAV to the landing position until the UAV reaches a proximity of the cylindrically curved surface; and
    switch from using the 3D point clouds to using the captured 2D slices to perform the autonomous detection and localization once the UAV reaches the proximity of the cylindrically curved surface.

3. The UAV of claim 2, wherein the control circuit is further configured to:
    autonomously direct the UAV to an alignment position within the proximity of the cylindrically curved surface prior to the perching, the alignment position being where the UAV is aligned with respect to the landing position; and
    use the captured 2D slices to autonomously direct the UAV to move directly from the alignment position to the landing position.

4. The UAV of claim 1, wherein the control circuit is further configured to autonomously detect and localize the cylindrically curved surface by fusing the 3D point clouds and the 2D slices, the fusing comprising:
    using one of the captured 3D point clouds to perform a first pass of the autonomous detection and localization of the cylindrically curved surface;
    capturing a corresponding one of the 2D slices using the detected and localized cylindrically curved surface from the first pass; and
    using the corresponding one of the 2D slices to perform a second pass of the autonomous detection and localization of the cylindrically curved surface.

5. The UAV of claim 1, further comprising an inertial measurement unit (IMU) configured to estimate the pose of the depth camera, wherein the control circuit is further configured to use the estimated pose of the depth camera between capturing a first one of the 3D point clouds and capturing a second one of the 3D point clouds in order to predict the location of the cylindrically curved surface in the second one of the 3D point clouds from the detected and localized cylindrically curved surface in the first one of the 3D point clouds.

6. The UAV of claim 1, wherein the control circuit is further configured to:
    use the captured 3D point clouds to autonomously detect and localize the cylindrically curved surface; and
    control the 2D LIDAR system to capture the 2D slices normal to the detected and localized cylindrically curved surface.

7. The UAV of claim 6, wherein the cylindrically curved surface is part of a cylinder and the control circuit is further configured to control the 2D LIDAR system to capture the 2D slices normal to the central axis of the cylinder.

8. The UAV of claim 1, wherein the control circuit is further configured to use a random sample consensus (RANSAC) approach to autonomously detect and localize the cylindrically curved surface.

9. The UAV of claim 1, wherein the control circuit is further configured to:
    use the captured 3D point clouds or the captured 2D slices or both the captured 3D point clouds and the captured 2D slices to detect one or more obstacles on a flight path of the UAV from the starting position to the landing position; and autonomously redirect the UAV to avoid the one or more obstacles on the flight path.

10. The UAV of claim 1, wherein the cylindrically curved surface is ferromagnetic and the perching mechanism comprises magnetic legs configured to magnetically attach to the ferromagnetic cylindrically curved surface during the perching and remain magnetically attached to the ferromagnetic cylindrically curved surface after the perching.

11. A method of autonomously perching an unmanned aerial vehicle (UAV) on a cylindrically curved surface from a starting position away from the cylindrically curved surface, the method comprising:
- capturing and outputting, using a three-dimensional (3D) depth camera attached to the UAV, 3D point clouds of scenes from the UAV comprising the cylindrically curved surface;
- capturing and outputting, using a two-dimensional (2D) light detection and ranging (LIDAR) system attached to the UAV, 2D slices of the scenes, the 2D LIDAR system having a one-dimensional (1D) field of view (FOV), in contrast to a 3D LIDAR system having a 2D FOV;
- mechanically perching the UAV on the cylindrically curved surface using a perching mechanism attached to the UAV;
- controlling the depth camera and the 2D LIDAR system to capture the 3D point clouds and the 2D slices, respectively, of the scenes;
- inputting the captured 3D point clouds from the depth camera and the captured 2D slices from the 2D LIDAR system;
- autonomously detecting and localizing the cylindrically curved surface using the captured 3D point clouds and the captured 2D slices;
- autonomously directing the UAV from the starting position to a landing position on the cylindrically curved surface based on the autonomous detection and localization of the cylindrically curved surface; and
- autonomously controlling the UAV to perch the UAV on the cylindrically curved surface at the landing position using the perching mechanism.

12. The method of claim 11, further comprising:
- using the captured 3D point clouds to perform the autonomous detection and localization from the starting position while autonomously directing the UAV to the landing position until the UAV reaches a proximity of the cylindrically curved surface; and
- switching from using the 3D point clouds to using the captured 2D slices to perform the autonomous detection and localization once the UAV reaches the proximity of the cylindrically curved surface.

13. The method of claim 12, further comprising:
- autonomously directing the UAV to an alignment position within the proximity of the cylindrically curved surface prior to the perching, where the UAV is aligned with respect to the landing position; and
- using the captured 2D slices to autonomously direct the UAV to move directly from the alignment position to the landing position.

14. The method of claim 11, further comprising autonomously detecting and localizing the cylindrically curved surface by fusing the 3D point clouds and the 2D slices, the fusing comprising:
- using one of the captured 3D point clouds to perform a first pass of the autonomous detection and localization of the cylindrically curved surface;
- capturing a corresponding one of the 2D slices using the detected and localized cylindrically curved surface from the first pass; and
- using the corresponding one of the 2D slices to perform a second pass of the autonomous detection and localization of the cylindrically curved surface.

15. The method of claim 11, wherein the UAV further comprises an inertial measurement unit (IMU) attached to the UAV, the method further comprising:
- estimating the pose of the depth camera using the IMU; and
- using the estimated pose of the depth camera between capturing a first one of the 3D point clouds and capturing a second one of the 3D point clouds in order to predict the location of the cylindrically curved surface in the second one of the 3D point clouds from the detected and localized cylindrically curved surface in the first one of the 3D point clouds.

16. The method of claim 11, further comprising:
- using the captured 3D point clouds to autonomously detect and localize the cylindrically curved surface; and
- controlling the 2D LIDAR system to capture the 2D slices normal to the detected and localized cylindrically curved surface.

17. The method of claim 16, wherein the cylindrically curved surface is part of a cylinder and the method further comprises controlling the 2D LIDAR system to capture the 2D slices normal to the central axis of the cylinder.

18. The method of claim 11, further comprising using a random sample consensus (RANSAC) approach to autonomously detect and localize the cylindrically curved surface.

19. The method of claim 11, further comprising:
- using the captured 3D point clouds or the captured 2D slices or both the captured 3D point clouds and the captured 2D slices to detect one or more obstacles on a flight path of the UAV from the starting position to the landing position; and
- autonomously redirecting the UAV to avoid the one or more obstacles on the flight path.

20. The method of claim 11, wherein the cylindrically curved surface is ferromagnetic, the perching mechanism comprises magnetic legs, and the method further comprises magnetically attaching the magnetic legs to the ferromagnetic cylindrically curved surface during the perching and remaining magnetically attached to the ferromagnetic cylindrically curved surface after the perching.

* * * * *